US009950292B2

(12) United States Patent
Pedace et al.

(10) Patent No.: US 9,950,292 B2
(45) Date of Patent: Apr. 24, 2018

(54) DEHUMIDIFYING APPARATUS

(71) Applicant: META INDUSTRIAL INC., Oakville (CA)

(72) Inventors: Giuseppe Alberto Pedace, Mississauga (CA); Pedro Miguel Gaio, Brampton (CA)

(73) Assignee: META INDUSTRIAL INC., Oakville (CA)

( * ) Notice: Subject to any disclaimer, the term of this patent is extended or adjusted under 35 U.S.C. 154(b) by 58 days.

(21) Appl. No.: 15/246,686

(22) Filed: Aug. 25, 2016

(65) Prior Publication Data

US 2016/0361681 A1    Dec. 15, 2016

Related U.S. Application Data

(62) Division of application No. 14/511,674, filed on Oct. 10, 2014, now Pat. No. 9,452,387.

(51) Int. Cl.
*B01D 53/04* (2006.01)
*B01D 53/26* (2006.01)
(Continued)

(52) U.S. Cl.
CPC ......... *B01D 53/0462* (2013.01); *B01D 53/04* (2013.01); *B01D 53/047* (2013.01);
(Continued)

(58) Field of Classification Search
CPC ............ B01D 53/0431; B01D 53/0462; B01D 53/0476; B01D 53/261; B01D 53/0446;
(Continued)

(56) References Cited

U.S. PATENT DOCUMENTS 3,487,608 A * 1/1970 Graff ...................... B01D 53/04
  95/123
3,757,492 A * 9/1973 Graff .................. B01D 53/0431
  96/123
(Continued)

OTHER PUBLICATIONS

Giuseppe Alberto Pedace, "Dehumidifying Apparatus," U.S. Appl. No. 14/511,674, filed Oct. 10, 2014.

*Primary Examiner* — Frank Lawrence
(74) *Attorney, Agent, or Firm* — Perry + Currier Inc.

(57) ABSTRACT

A dehumidifier includes a first air distribution assembly connected to a process air inlet for receiving process air, and to a regeneration air outlet for exhausting regeneration air; and a second air distribution assembly connected to a process air outlet for delivering process air, and to a regeneration air inlet for receiving regeneration air. The dehumidifier includes multiple stationary modules connected in parallel between the air distribution assemblies. Each module contains desiccant and has opposing apertures for connecting to the air distribution assemblies. The air distribution assemblies are configured to cycle between a number of positions equal to the number of modules. In each position, the air distribution assemblies establish a regeneration air flow from the regeneration air inlet to the regeneration air outlet via one module, and a plurality of process air flows from the process air inlet to the process air outlet via each remaining module.

23 Claims, 19 Drawing Sheets

(51) Int. Cl.
  *B01D 53/047* (2006.01)
  *F24F 3/14* (2006.01)
  *F26B 5/00* (2006.01)

(52) U.S. Cl.
  CPC ..... *B01D 53/0431* (2013.01); *B01D 53/0476* (2013.01); *B01D 53/261* (2013.01); *F24F 3/1411* (2013.01); *F26B 5/00* (2013.01); *B01D 53/0446* (2013.01); *B01D 2257/80* (2013.01); *B01D 2259/403* (2013.01); *B01D 2259/404* (2013.01); *B01D 2259/40007* (2013.01); *B01D 2259/40009* (2013.01); *B01D 2259/4009* (2013.01)

(58) Field of Classification Search
  CPC ...... B01D 2257/80; B01D 2259/40007; B01D 2259/40009; B01D 2259/4009; B01D 2259/403; B01D 2259/404; F24F 3/1411; F26B 5/00
  USPC ....... 96/121, 124, 138, 146; 34/472, 473, 80
  See application file for complete search history.

(56) References Cited

U.S. PATENT DOCUMENTS

| | | | | |
|---|---|---|---|---|
| 4,601,114 | A * | 7/1986 | Noguchi | B01D 53/261 34/451 |
| 5,566,468 | A * | 10/1996 | Graeff | B01D 53/261 34/473 |
| 5,891,217 | A * | 4/1999 | Lemcoff | B01D 53/0446 95/130 |
| 6,405,454 | B1 * | 6/2002 | Kramer | F26B 17/124 34/181 |
| 7,276,107 | B2 * | 10/2007 | Baksh | B01D 53/0446 95/96 |
| 8,419,830 | B2 * | 4/2013 | Masetto | B01D 53/0407 95/148 |
| 2004/0040172 | A1 * | 3/2004 | Crawford | B01D 53/0454 34/330 |
| 2008/0000353 | A1 * | 1/2008 | Rarig | B01D 53/0446 95/100 |
| 2014/0076164 | A1 * | 3/2014 | Monereau | B01D 53/0473 96/109 |

\* cited by examiner

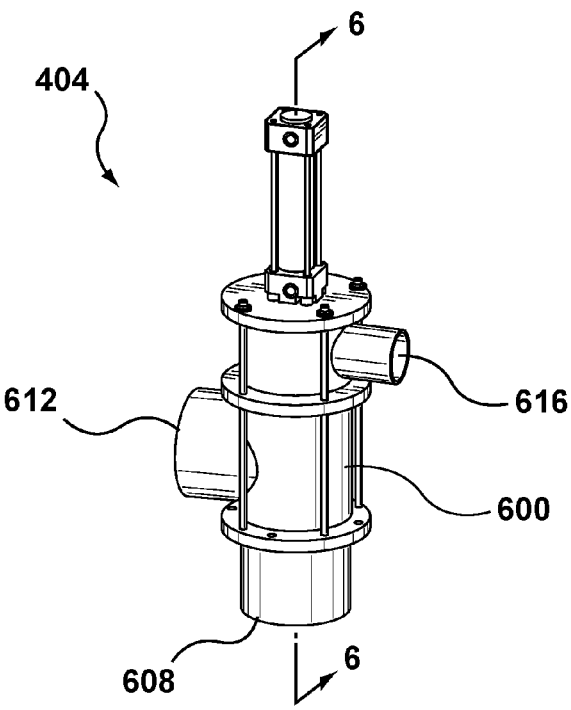
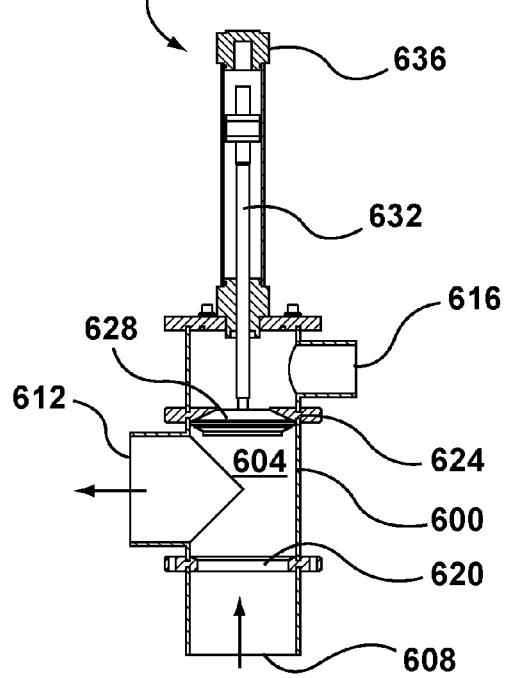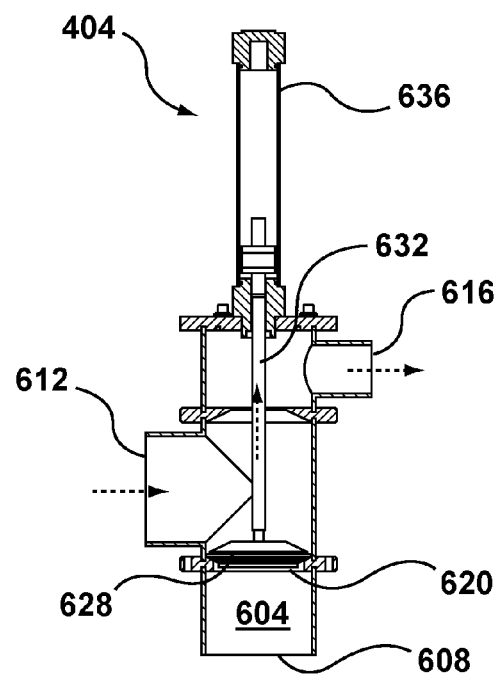
FIG. 6A
FIG. 6B  FIG. 6C

DEHUMIDIFYING APPARATUS

CROSS-REFERENCE TO RELATED APPLICATIONS

This patent is a divisional of U.S. patent application Ser. No. 14/511,674, filed Oct. 10, 2014 and now issued as U.S. Pat. No. 9,452,387.

FIELD

The specification relates generally to drying equipment, and specifically to a dehumidifying apparatus for dehumidifying process air for use in drying applications.

BACKGROUND

Thermoplastics, such as polyethylene terephthalate (PET), used in injection molding processes are often supplied as beads or grains of resin. The beads are fed into heating units to liquefy the plastic before injection into the mold. The resin, particularly for highly hygroscopic plastics, is generally dried to remove excess moisture before heating and injection, as elevated moisture levels can lead to injection-molded products that are structurally flawed, aesthetically flawed, or both.

Resin drying machines conventionally include dehumidifying mechanisms to dry moisture-laden air that has passed through the resin before recycling that air to remove further moisture from the resin. Two dominant dehumidifying technologies in use with resin dryers are dual-bed dehumidifiers, and rotary dehumidifiers.

Dual-bed dehumidifiers (also referred to as twin tower dehumidifiers) generally consist of a pair of towers, each containing a bed of desiccant material such as a molecular sieve. Humid process air is blown through a first one of the towers, where it is dried by the desiccant material, before being routed to a resin drying chamber to remove moisture from resin beads in the chamber. As the bed of desiccant becomes saturated with moisture from the process air, its effectiveness in absorbing further moisture falls over time. The first tower is then switched to a regeneration mode, and process air is redirected through the second tower instead of the first tower. In the regeneration mode, heated air is passed through the bed of desiccant in the first tower to remove accumulated moisture. Although dual-bed dehumidifiers can achieve low dew points in process air output, the humidity of the outgoing process air can suffer from inconsistency. For example, there may be sharp changes in the humidity of the process air when one bed approaches saturation and process air is switched to the other bed. Further, maintaining dual-bed dehumidifiers can be laborious and time-consuming; for example, inspecting or replacing the desiccant in a tower requires that the tower be disassembled and cleaned out by hand.

Rotary dehumidifiers employ a disk containing a desiccant material, generally a silica gel containing a suspension of molecular sieve material. The disk rotates continuously, and process air is blown through one part of the disk while heated regeneration air is blown through another part of the disk. The continuous handling of process and regeneration air can provide for more consistent performance characteristics than can be obtained from dual-bed systems. However, rotary dehumidifiers generally do not achieve the same low dew points as dual-bed dehumidifiers unless the process air entering the disk is sufficiently cool. In some rotary machines, the process air is therefore cooled before passing through the disk, and then must be heated before travelling to the resin dryer. The large changes in temperature consume significant amounts of energy, reducing the efficiency of rotary dehumidifiers. Further, the seals between process and regeneration air conduits and the disk wear out over time. Until the seals are replaced, the efficiency of the dehumidifier may be further reduced.

SUMMARY

According to an aspect of the specification, a dehumidifying apparatus is provided, comprising: a first air distribution assembly connected to a process air inlet for receiving process air from the process air inlet, and to a regeneration air outlet for exhausting regeneration air via a vacuum unit; and a second air distribution assembly connected to a process air outlet for delivering process air to the process air outlet, and to a regeneration air inlet for receiving regeneration air. The apparatus also comprises at least three stationary modules connected in parallel between the first air distribution assembly and the second air distribution assembly. Each module contains a desiccant and has a first aperture for connecting to the first air distribution assembly, and an opposite second aperture for connecting to the second air distribution assembly; the first and second air distribution assemblies are configured to cycle between a number of discrete positions equal to the number of modules. In each position, the first and second air distribution assemblies are configured to establish: (i) a regeneration air flow from the regeneration air inlet to the regeneration air outlet via, in sequence: the second air distribution assembly, the second aperture of one module, the first aperture of the one module, and the first air distribution assembly; and (ii) a plurality of process air flows from the process air inlet to the process air outlet via, in sequence: the first air distribution assembly, the first aperture of each remaining module, the second aperture of each remaining module, and the second air distribution assembly.

According to another aspect of the specification, a process is provided for controlling a dehumidifying apparatus having a plurality of desiccant modules connected in parallel between a first air distribution assembly connected to a process air inlet, and a second air distribution assembly connected to a process air outlet. The process comprises: setting the first and second air distribution assemblies in a first one of a plurality of discrete positions, for establishing a regeneration air flow between a regeneration air inlet and a regeneration air outlet via a first one of the modules and a process air flow through each of the modules other than the first module; activating (i) a heater disposed within the first one of the modules, and (ii) a vacuum unit connected to the regeneration air outlet; determining whether a cycling condition is met; when the determination is affirmative, deactivating the heater and the vacuum unit, and cycling the first and second air distribution assemblies to a second one of the discrete positions, for establishing the regeneration air flow through a next one of the modules and the process air flows through each of the modules other than the next module; and, in response to cycling the first and second air distribution assemblies to the second position, repeating the activating and determining.

BRIEF DESCRIPTIONS OF THE DRAWINGS

Embodiments are described with reference to the following figures, in which:

FIG. 6A depicts an isometric view of a valve in the apparatus of FIG. 1, according to a non-limiting embodiment;

FIG. 6B depicts a cross-sectional view of the valve of FIG. 6A in a first position, according to a non-limiting embodiment;

FIG. 6C depicts a cross-sectional view of the valve of FIG. 6A in a second position, according to a non-limiting embodiment;

Figure 1:
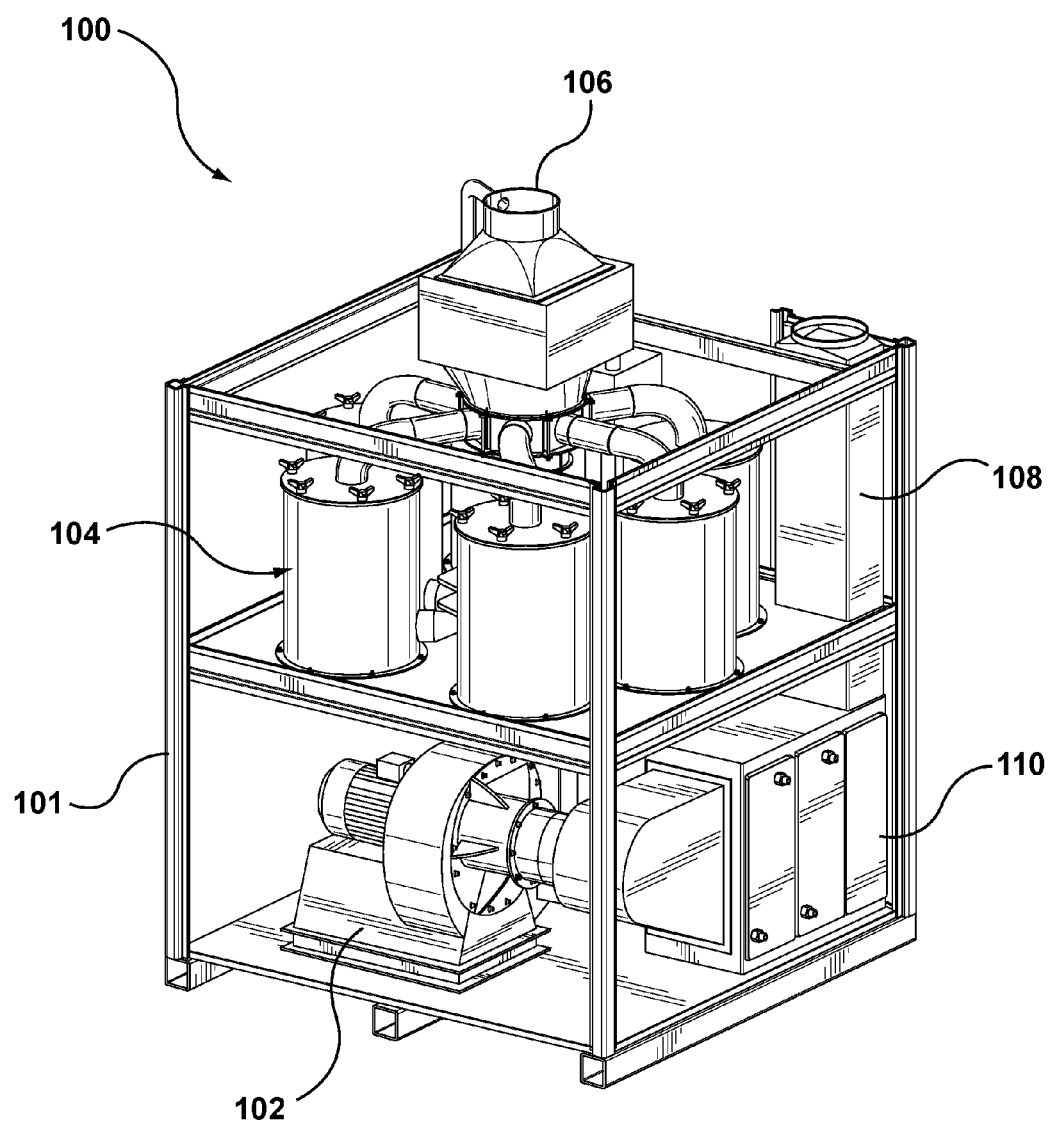
FIG. 1 depicts a dehumidifying apparatus, according to a non-limiting embodiment.
Figure 2:
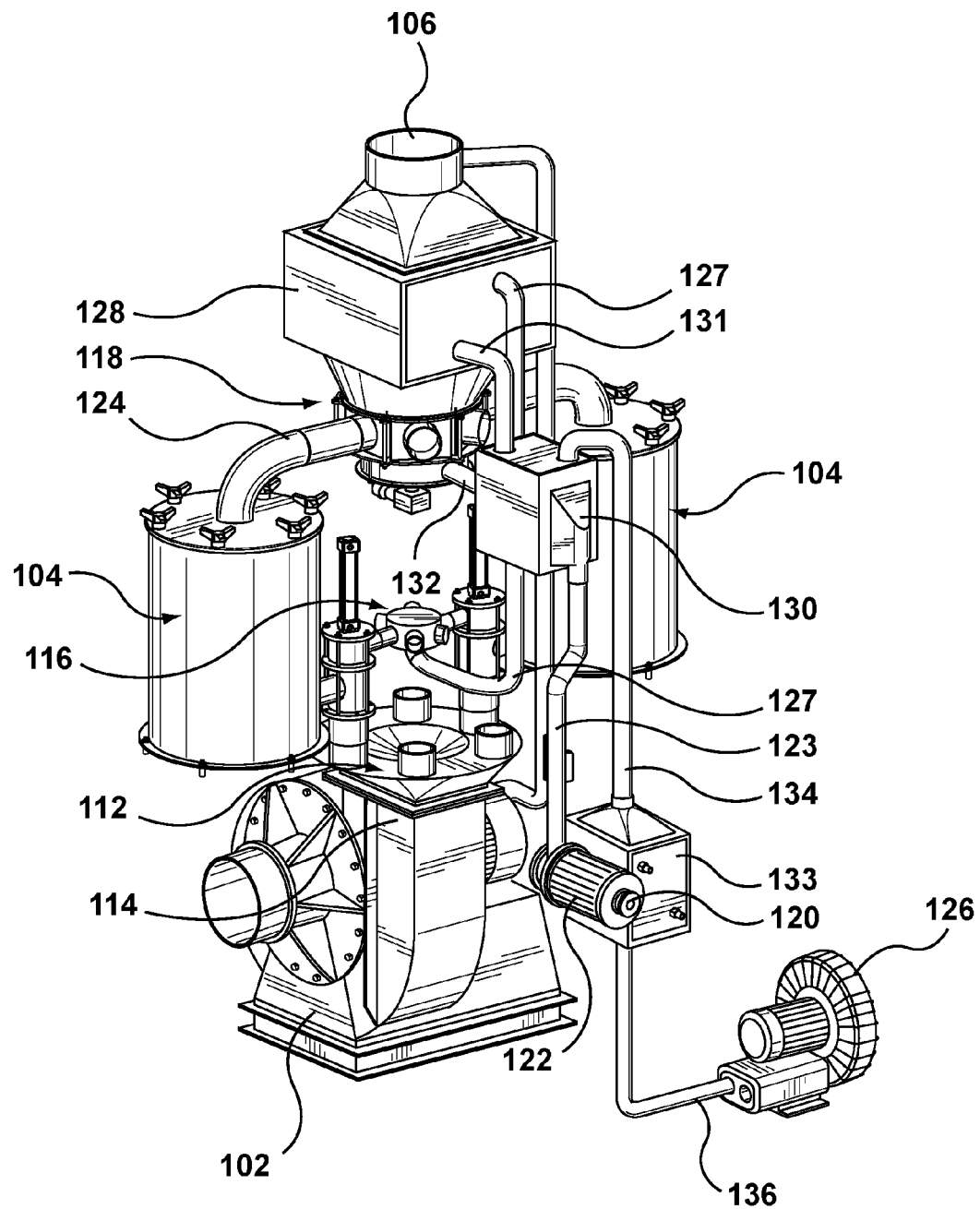
FIG. 2 depicts a partial isometric view of the apparatus of FIG. 1, according to a non-limiting embodiment.
Figure 13:
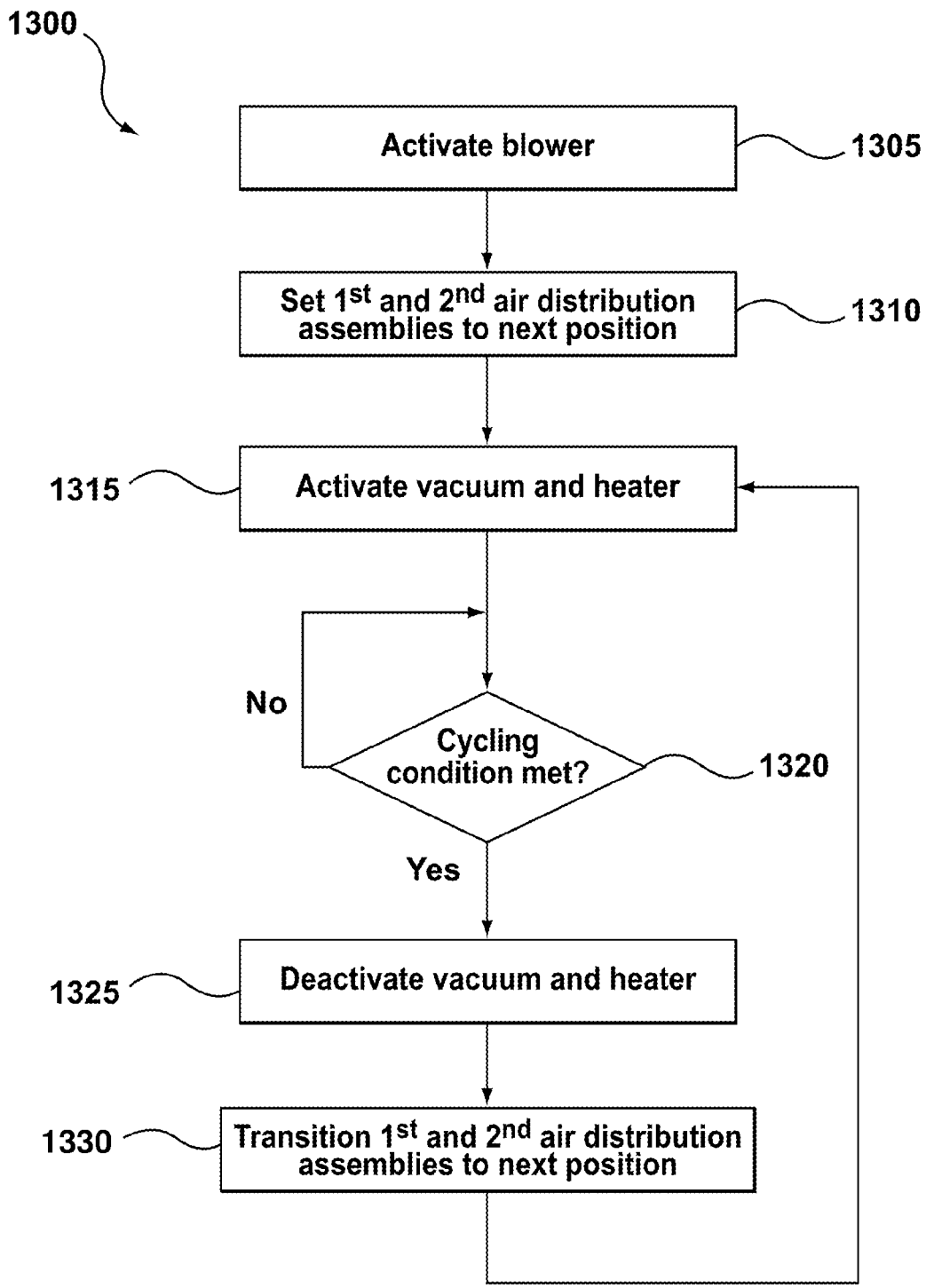
Figure 14:
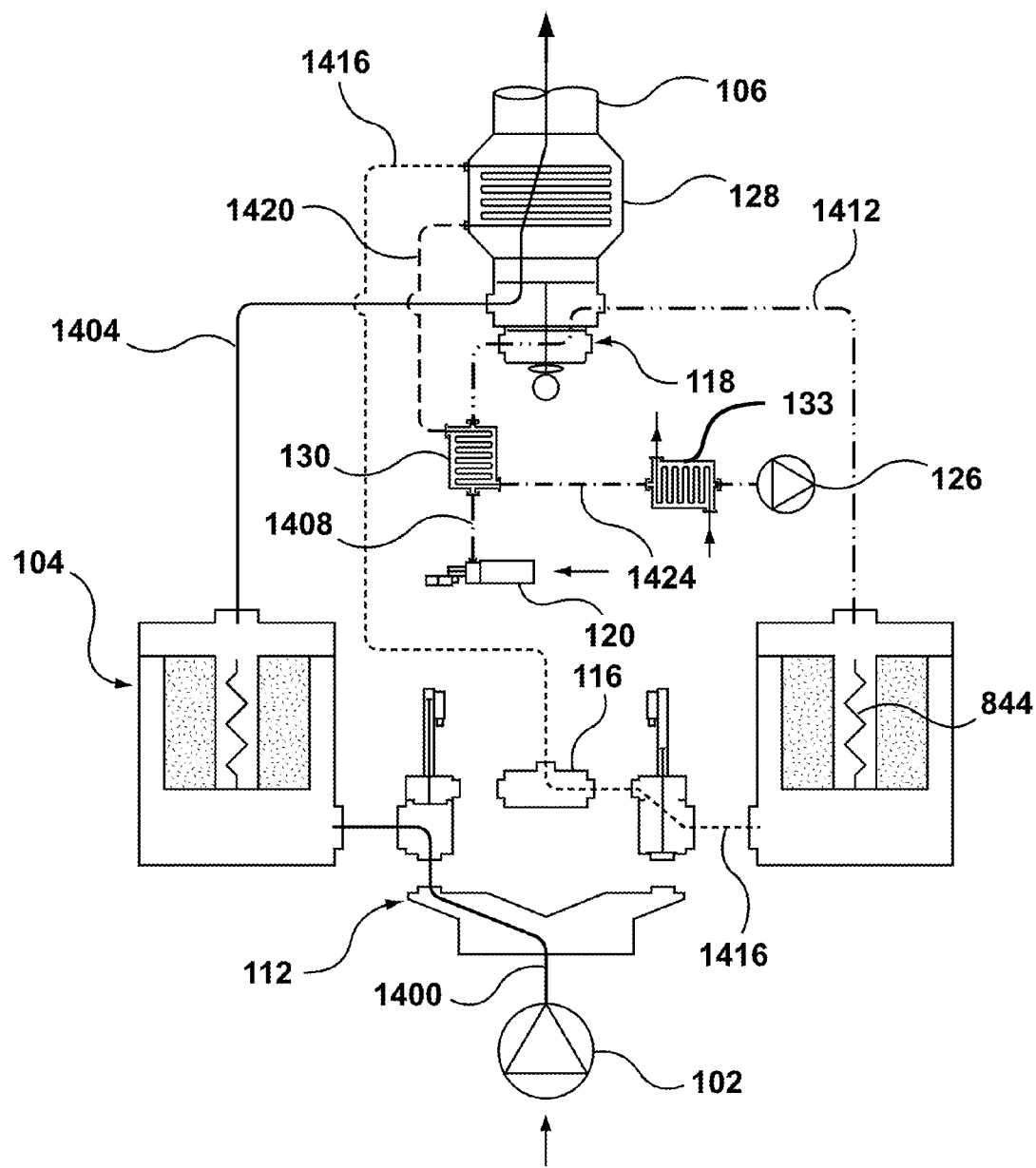
Figures 15A, 15B:
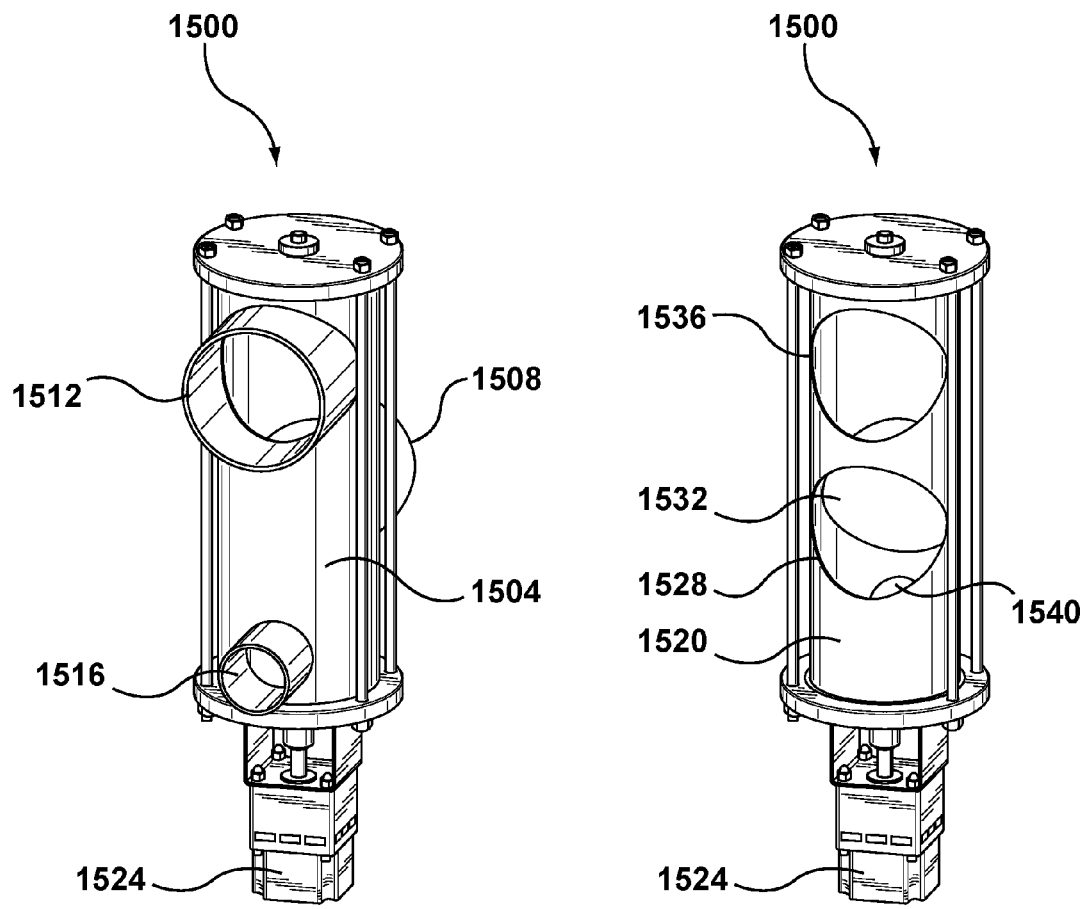
Figure 16:
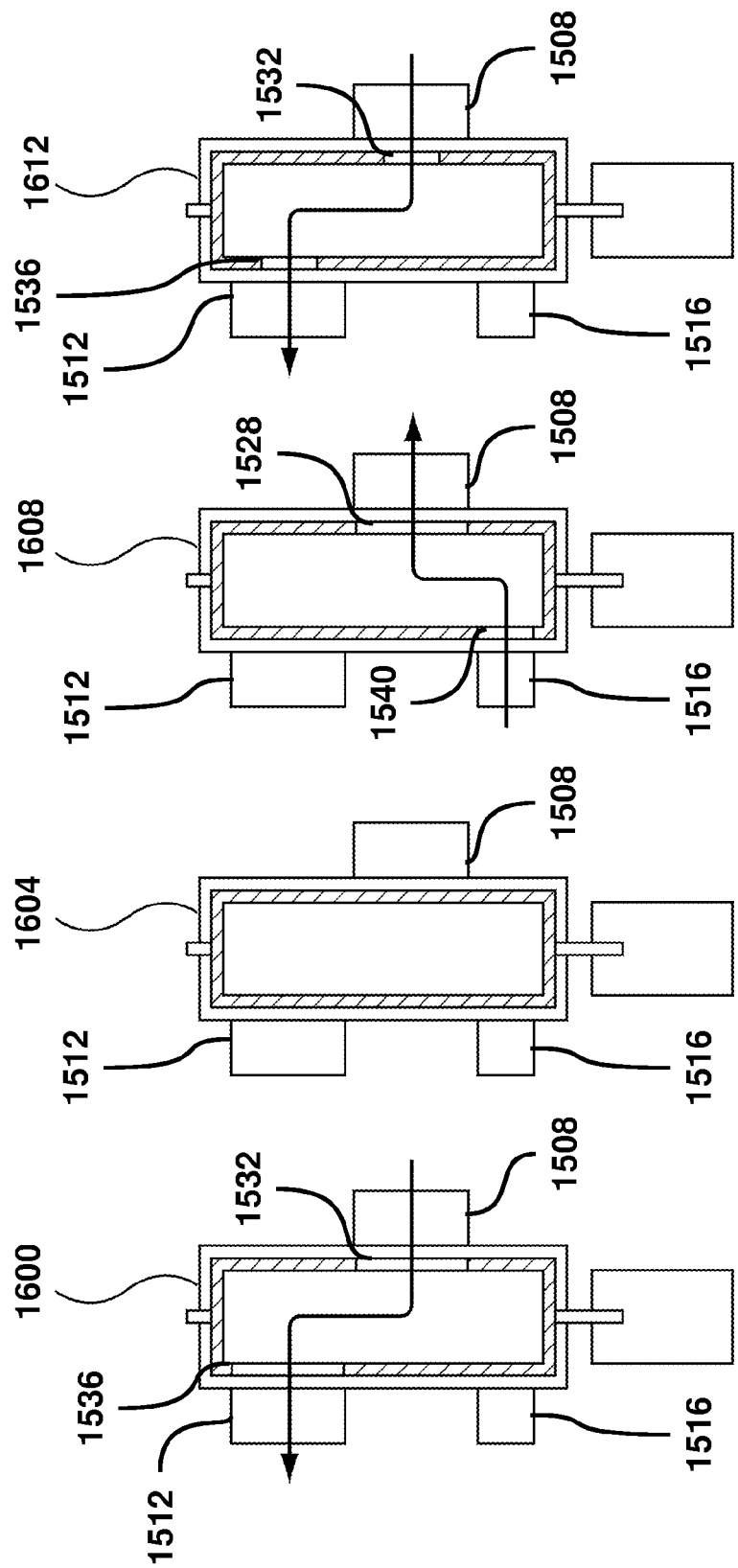
Figure 17B:
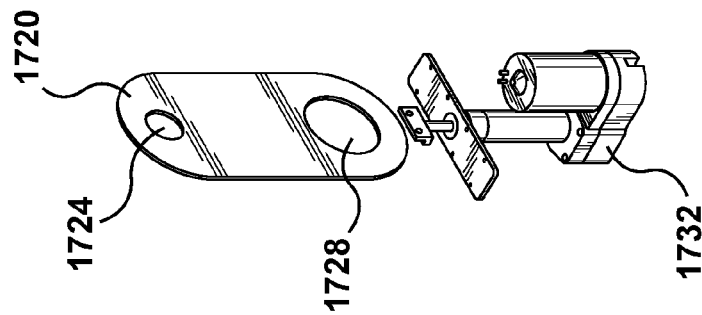
Figure 17A:
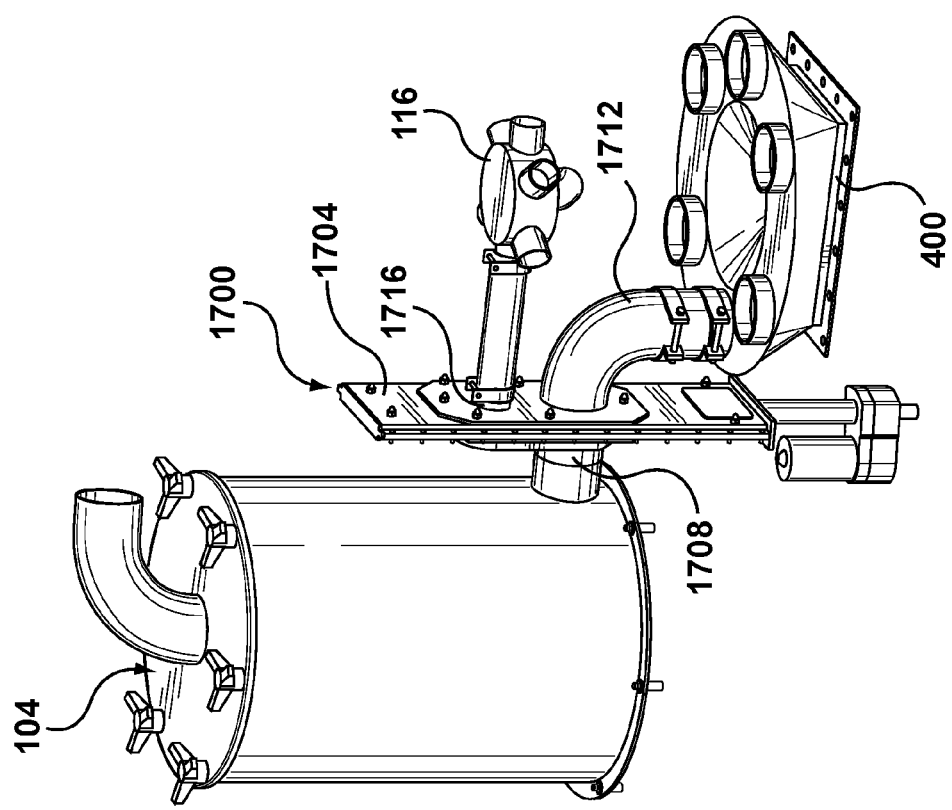
Figure 18:
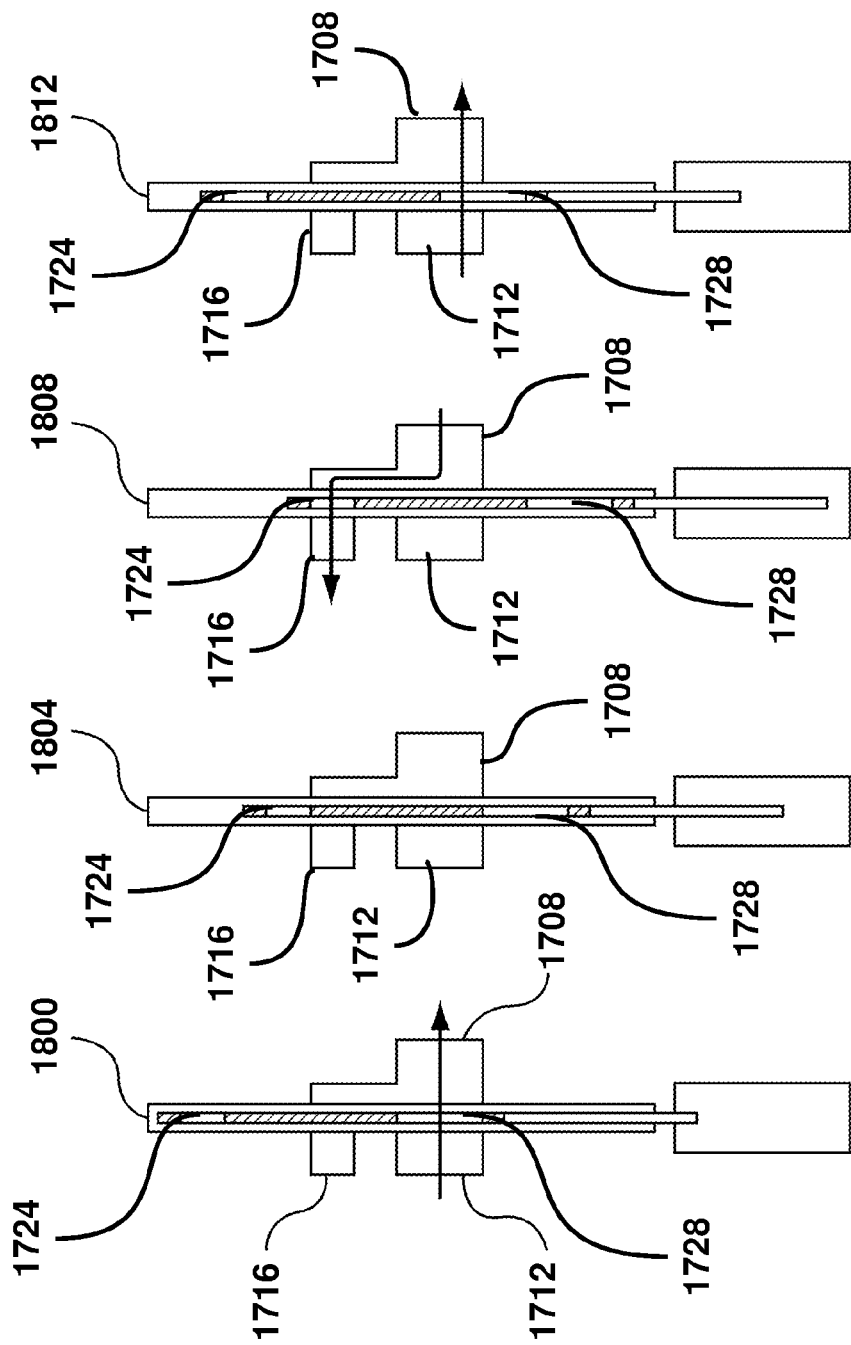
Figure 19:
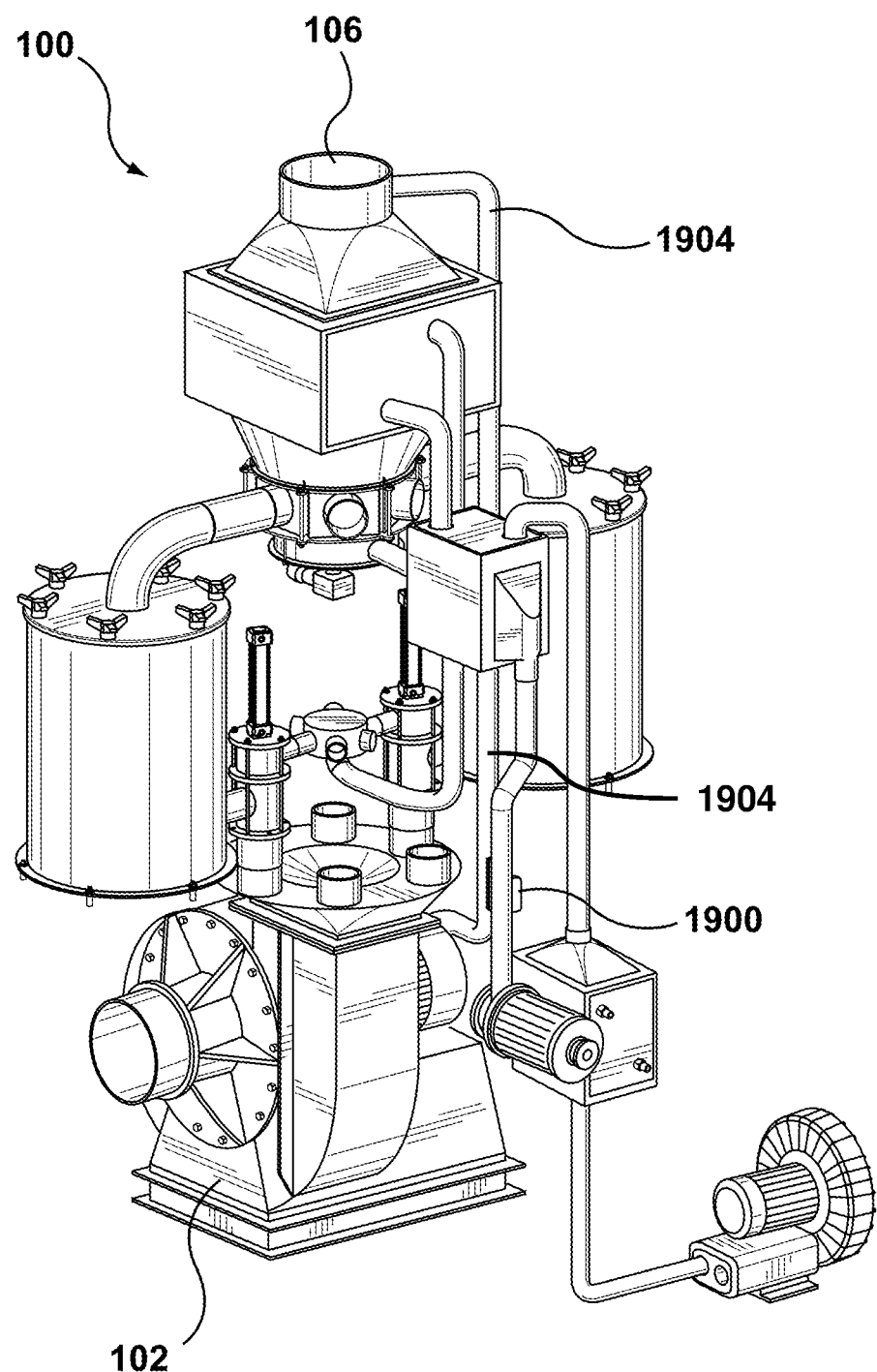

FIG. 13 depicts a method of controlling the apparatus of FIG. 1, according to a non-limiting embodiment FIG. 14 depicts a schematic representation of air flows in the apparatus of FIG. 1, according to a non-limiting embodiment FIG. 15A depicts an alternative valve for use in the apparatus of FIG. 1, according to a non-limiting embodiment FIG. 15B depicts a partial view of the alternative valve of FIG. 15A, according to a non-limiting embodiment FIG. 16 depicts cross-sectional views of the valve of FIG. 15A in various operational positions, according to a non-limiting embodiment FIG. 17A depicts a further alternative valve for use in the apparatus of FIG. 1, according to a non-limiting embodiment FIG. 17B depicts a partial view of the alternative valve of FIG. 17A, according to a non-limiting embodiment;

FIG. 18 depicts cross-sectional views of the valve of FIG. 17A in various operational positions, according to a non-limiting embodiment; and FIG. 19 depicts the partial view of FIG. 2, with a further component identified, according to a non-limiting embodiment.

DETAILED DESCRIPTION OF THE EMBODIMENTS

FIG. 1 depicts a dehumidifying apparatus 100 for use in conjunction with other drying equipment (not shown), such as a plastic resin dryer. The components of apparatus 100 are supported by a frame 101 which can have a wide variety of structures. In addition, apparatus 100 can include a housing (e.g. mounted to frame 101) surrounding the components described herein, however the housing is omitted in FIG. 1 for illustrative purposes. Frame 101 and the above-mentioned housing can be omitted in other embodiments; it will be apparent in the description below that various arrangements may be used to support the components of apparatus 100.

An air supply, such as a blower 102, supplies process air to at least three stationary desiccant modules 104. Apparatus 100 as illustrated includes six modules 104, although a variety of other configurations are also contemplated, including configurations with three, four, five, seven or eight modules 104. Larger numbers of modules 104 can also be used. In the present example, modules 104 are arranged radially, in a ring centered on process air outlet 106. Other arrangements of modules 104 can also be employed, however.

Modules 104, which will be described in greater detail below, remove moisture from the process air before the process air is delivered to a process air outlet 106. From process air outlet 106, the process air may be delivered to, for example, a heater and a resin dryer, in order to absorb moisture from the resin prior to delivery of the dried resin to a plastic injection process.

In some embodiments, the process air flow is a closed loop. That is, after the dried process air travels from outlet 106 to (for example) a resin dryer and absorbs moisture from the resin, the process air returns to blower 102, for example via a conduit 108 (which may include a filter, not shown) and a cooler 110. Cooler 110 is provided to lower the temperature of the process air sufficiently to avoid damage to blower 102. In applications where the process air arriving at blower 102 does not have a temperature above a temperature that is tolerable to blower 102, cooler 110 can be omitted. The specific source and destination of the process air to and from apparatus 100 are not particularly limited, and apparatus 100 can also be implemented in open-loop configurations, where blower 102 supplies atmospheric air to modules 104.

Thus, apparatus 100 makes use of multiple stationary desiccant modules 104 to remove moisture from process air. As will now be apparent to those skilled in the art, the desiccant contained within modules 104 will eventually become saturated with water absorbed from the process air. Therefore, apparatus 100 is also configured to interrupt the delivery of process air to one of modules 104 at a time, and to instead deliver regeneration air to the module 104 not receiving process air, in a direction opposite to the direction of process air flow. The regeneration air, whose delivery mechanism will be detailed herein, is generally heated in order to more effectively remove moisture from the desiccant in modules 104 and then, carrying that moisture, is exhausted to the atmosphere.

As will be discussed in greater detail below, apparatus 100 includes air distribution assemblies that are configured to deliver regeneration air to a single module 104, while simultaneously delivering process air to the remaining ones of modules 104. The air distribution assemblies also cycle through a number of discrete positions, to deliver regeneration air to each of the modules 104 in turn while simultaneously delivering process air to the remaining modules 104 not under regeneration. Thus, at any given time, one module 104 is under regeneration and the other modules 104 handle process air. Which modules 104 receive regeneration air and which modules 104 receive process air changes as the air distribution assemblies cycle through their discrete positions. As will be seen below, this is accomplished without any movement of modules 104 themselves.

Turning now to FIG. 2, a view of apparatus 100 is illustrated in which four of the six modules 104, as well as frame 101, conduit 108 and cooler 110, have been omitted in order to reveal further aspects of the internal structure of apparatus 100. As seen in FIG. 2, apparatus 100 includes a first air distribution assembly 112 connected to a process air inlet 114 (which in the present example is the outlet of blower 102) for receiving process air from process air inlet 114. First air distribution assembly 112 is also connected to a regeneration air outlet 116 for exhausting regeneration air after the regeneration air has passed through one of modules 104.

Apparatus 100 also includes a second air distribution assembly 118 connected to process air outlet 106 for delivering process air (dried by modules 104) to process air outlet 106. Second air distribution assembly 118 is also connected to a regeneration air inlet 120 for receiving regeneration air from regeneration air inlet 120, for example from the atmosphere via a filter 122 and a conduit 123.

Modules 104 (only two of which are shown in FIG. 2, from a total of six in the illustrated embodiment) are connected in parallel between first air distribution assembly 112 and second air distribution assembly 118. Each module 104 contains a desiccant material, and various structures can be employed for modules 104, examples of which will be discussed in detail further below.

Each module 104 connects to first air distribution assembly 112 via a first aperture, and connects to second air distribution assembly 118 via a second aperture opposite the first aperture, and a conduit 124. The first and second apertures mentioned above are not directly visible in the assembled configuration shown in FIG. 2, but will be illustrated later herein.

First and second air distribution assemblies 112 and 118 are configured to cycle between a number of discrete positions equal to the number of modules 104. Air distribution assemblies 112 and 118 therefore each have six discrete positions in the illustrated embodiment. In each position, the first and second air distribution assemblies 112 and 118 are configured to establish one regeneration air flow, and a number of process air flows equal to one less than the total number of modules 104 (five process air flows in the illustrated embodiment).

The regeneration and process flows will be discussed in greater detail below. In brief, however, the regeneration airflow travels from regeneration air inlet 120 to regeneration air outlet 116 via, in sequence: (1) second air distribution assembly 118; (2) one of conduits 124 and a corresponding one of modules 104, entering through the second aperture and exiting through the first aperture of the module 104; and (3) first air distribution assembly 112.

The process air flows travel from process air inlet 114 to process air outlet 106 via, in sequence: (1) first air distribution assembly 112; (2) each of the modules 104 not under regeneration, entering through the first aperture and exiting through the second aperture of each respective module 104; and (3) second air distribution assembly 118.

Apparatus 100 also includes a vacuum unit 126 for applying a negative pressure to regeneration air outlet 116, and in turn throughout the above-mentioned regeneration air flow path, pulling atmospheric air into regeneration air inlet 120. As seen in FIG. 2, regeneration air outlet 116 is not connected directly (e.g. by a single direct conduit) to vacuum unit 126. Instead, regeneration air outlet 116 in the illustrated configuration exhausts used regeneration air (regeneration air that has passed through a module 104 and absorbed moisture therefrom) to the atmosphere via other components.

Specifically, regeneration air leaving regeneration air outlet 116 travels through a conduit 127 to a process heat exchanger 128, and then to a regeneration heat exchanger 130 via a conduit 131. It will now be apparent that regeneration air from regeneration air inlet 120 is also directed, via conduit 123, to heat exchanger 130 before arriving at second air distribution assembly 118 via a further conduit 132. Regeneration air is generally heated to increase the effectiveness with which it absorbs moisture from modules 104. To that end, modules 104 themselves can include heaters, and as a result regeneration air leaving regeneration air outlet 116 is moisture-laden and heated. Thus, heat exchanger 128 allows some heat to be transferred from the regeneration air to dry process air (which typically will be heated further before its downstream application) travelling towards process air outlet 106, and heat exchanger 130 allows additional heat to be transferred from the "used" regeneration air to pre-heat "fresh" regeneration air from regeneration air inlet 120.

From conduit 131 and heat exchanger 130, the regeneration air then travels to a cooler 133 via a conduit 134, before finally exhausting to the atmosphere at vacuum unit 126 (via another conduit 136). In some embodiments, cooler 133 is omitted, when the regeneration air arriving at vacuum unit 126 does not exceed a heat tolerance of vacuum unit 126. In other embodiments, one or more of heat exchangers 128 and 130 can also be omitted, to simplify or reduce the cost of apparatus 100, although omitting the heat exchangers may reduce the energy efficiency of apparatus 100. Vacuum unit 126 is the final point at which regeneration air is exhausted to the atmosphere, regardless of whether the above-mentioned heat exchangers 128, 130 and cooler 133 are included.

Figure 3:
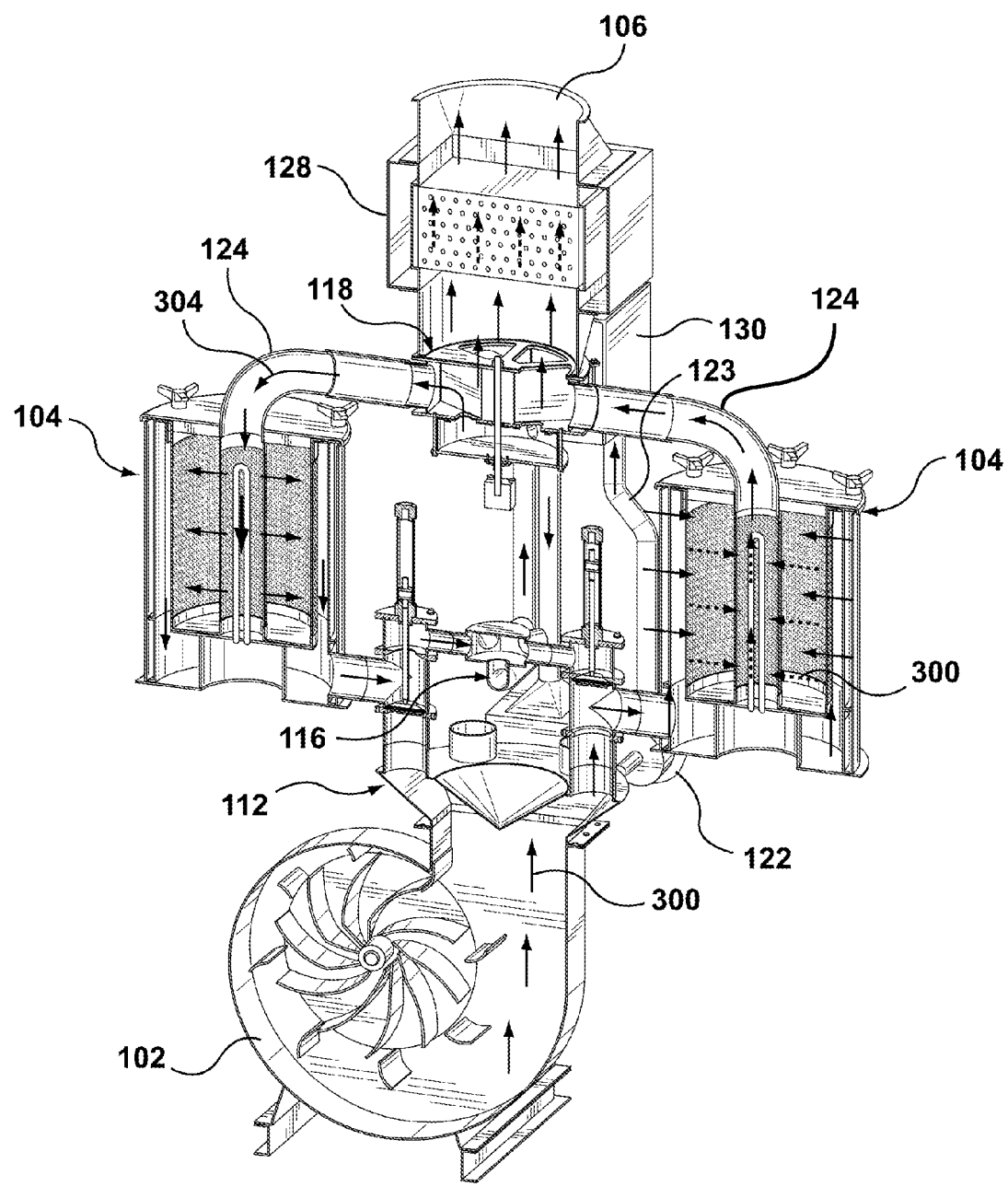
FIG. 3 depicts a cross-section of the partial isometric view of FIG. 2, according to a non-limiting embodiment.
Figure 4:
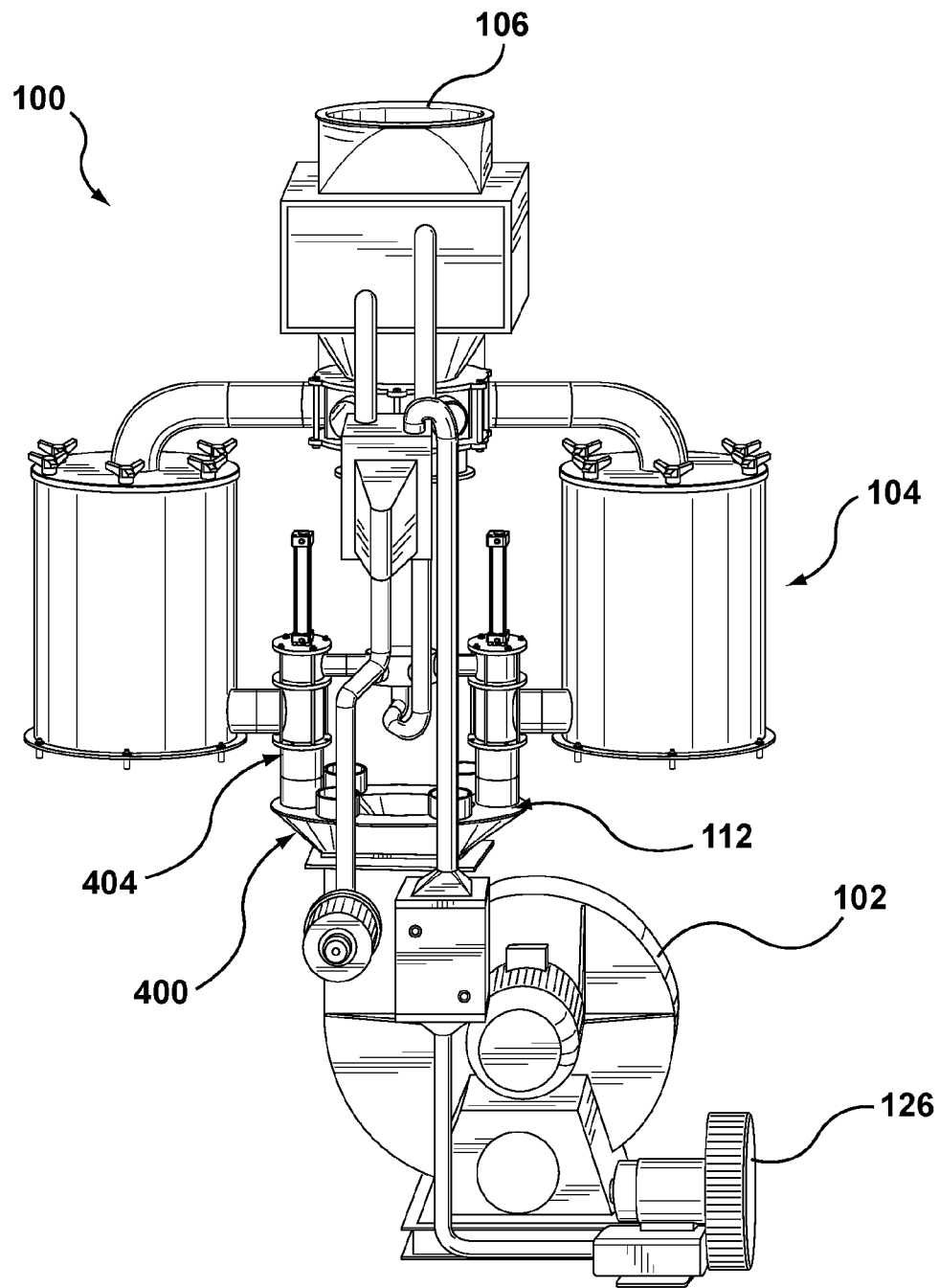
FIG. 4 depicts the partial isometric view of FIG. 2 in another orientation, according to a non-limiting embodiment.

Referring now to FIG. 3, another illustration of the process air and regeneration air flows is provided in conjunction with a cross-sectional view of apparatus 100. As with FIG. 2, FIG. 3 omits all but two of modules 104, as well as various other components of apparatus 100 to reveal certain internal features of apparatus 100.

One exemplary process air flow is shown using shaded arrows 300, and an exemplary regeneration air flow is also shown using non-shaded arrows 304. As seen in FIG. 3, the process air flow travels from blower 102, into first air distribution assembly 112 and then into a module 104. Although not shown in FIG. 3, process air also enters four other modules 104 from first air distribution assembly 112 in the present example.

After flowing through module 104, the process air, carrying a reduced moisture load, travels through conduit 124 to second air distribution assembly 118. Dried process air from the four modules 104 not illustrated also rejoins the illustrated process air in second air distribution assembly 118. From second air distribution assembly 118, the process air travels through heat exchanger 128—where the process air is pre-heated by used regeneration air, as will be discussed below—and on to process air outlet 106.

As shown by arrows 304, regeneration air enters second air distribution assembly 118 via inlet 120 (not shown), filter 122, conduit 123, heat exchanger 130 and conduit 132 (not shown). Regeneration air then travels into conduit 124 of the single module 104 under regeneration. After flowing through module 104 in a direction opposite from the flow of process air, the (now humid) regeneration air enters first air distribution assembly 112 and is carried to regeneration air outlet 116. From regeneration air outlet 116, regeneration air travels through conduit 127 to heat exchanger 128 and then to vacuum unit 126 (not shown) via conduit 131 (not shown), heat exchanger 130, conduit 134 (illustrated with a "downwards" arrow 304 but not labelled to retain legibility) and cooler 133 (partially visible, but not labelled to retain legibility).

The provision and cycling of a regeneration air flow and multiple process air flows to the plurality of stationary modules 104 can be achieved by various structural features of apparatus 100 and its components. Below, certain examples of such structural features are described, in conjunction with modules 104, first air distribution assembly 112, second air distribution assembly 118, and regeneration air outlet 116.

Turning to FIGS. 4, 5A-5B and 6A-6C, first air distribution assembly 112 will be discussed in greater detail. In general, first air distribution assembly 112 includes an opening for receiving process air, at least one opening for exhausting regeneration air, a plurality of openings for exchanging air with modules 104, and a selection mechanism for connecting each of the module openings with either the process air opening or the regeneration air opening. In the embodiment illustrated in FIG. 4, first air distribution assembly 112 includes a diffuser 400 (providing the above-mentioned process air opening), and a plurality of valves 404 (providing the above-mentioned regeneration air openings, module openings and selection mechanism). In particular, although only two valves 404 are shown, first air distribution assembly 112 includes one valve 404 for each module 104.

Figure 5A:
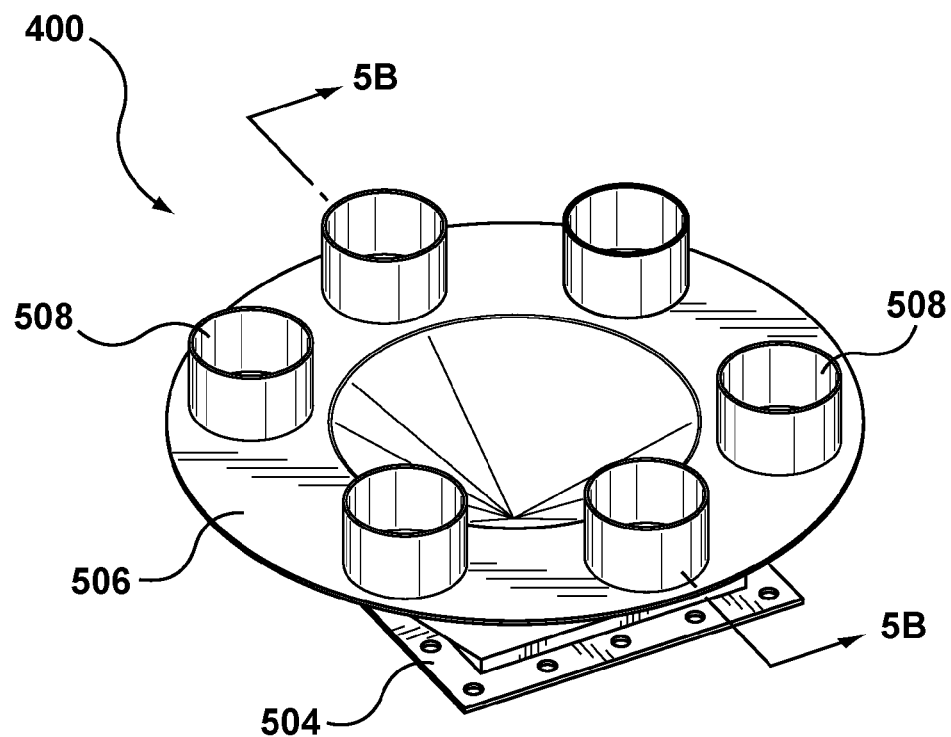
FIG. 5A depicts an isometric view of a diffuser of the apparatus of FIG. 1, according to a non-limiting embodiment.
Figure 5B:
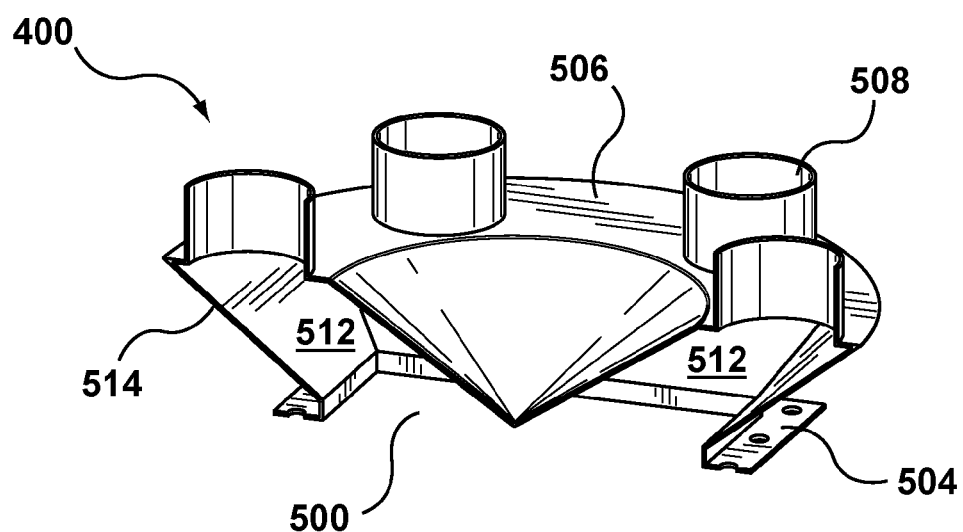
FIG. 5B depicts a cross-sectional view of the diffuser of FIG. 5A, according to a non-limiting embodiment.

FIGS. 5A and 5B depict diffuser 400 in greater detail, with FIG. 5B depicting a cross-section of diffuser 400 taken at section line 5B-5B. Diffuser 400 includes an intake 500 surrounded by a flange 504 or other suitable attachment surface for connecting diffuser 400 to process air inlet 114. Any suitable fastener can be used to connect flange 504 to process air inlet 114, including screws, bolts, welds, adhesives, clamps, and the like. When diffuser 400 is installed within apparatus 100, process air inlet 106 is in communication with intake 500.

At the opposite end of diffuser 400 from intake 500 is a cap 506 with a plurality of ports 508 defined therein. Intake 500 is in communication with ports 508 via a plenum 512 defined by cap 506 and an outer wall 514 extending between flange 504 and cap 506. Specifically, the number of ports 508 is equal to the number of modules 104, and thus in the present example, diffuser 400 includes six ports 508. Each port 508 connects to a corresponding valve 404 to deliver process air to the corresponding valve 404. Although each port 508 is shown as a cylindrical structure extending from cap 506, a wide variety of structures are contemplated for ports 508. For example ports 508 can be provided as holes flush with the surface of cap 506. In other examples, ports 508 can be square, elliptical, or the like, rather the cylindrical or circular.

Cap 506 may have a variety of structures. In the present example, cap 506 is includes a central conical depression protruding into plenum 512. In other embodiments, cap 506 can be flat; in still other embodiments, cap 506 can include a hemispherical depression rather than a conical depression.

Referring now to FIGS. 6A, 6B and 6C, a valve 404 is illustrated. One valve 404 is provided for each port 508 (in other words, the same number of valves 404 are provided as the number of ports 508 and modules 104). Each valve 404 includes a hollow valve body 600 defining a chamber 604 therein (as shown in FIGS. 6A and 6B, which illustrate a cross section of valve 404 taken along the line 6-6). Valve body 600 includes various openings therein, including a process air intake 608, which connects to a port 508 of diffuser 400; a module port 612 for connecting to the first aperture of a module 104; and a regeneration air output 616 for connecting to regeneration air outlet 116.

Valve 404 includes a first valve seat 620 between process air intake 608 and module port 612, and a second valve seat 624 between module port 612 and regeneration air output 616. Valve seats 620 and 624 extend from the inner wall of valve body 600 into chamber 604, defining surfaces with which a valve head 628 can engage. Valve head 628 is mounted at one end of a rod 632 slidably mounted within a control channel 636 and extending into chamber 604. Control channel 636 can include a magnetic coil or other driving mechanism for sliding rod 632 (and by extension, valve head 628) between two positions. The first position, shown in FIG. 6B, places valve head 628 in engagement with second valve seat 624, thus isolating regeneration air output 616 from process air intake 608 and module port 612, while allowing fluid communication between process air intake 608 and module port 612. In the first position, process air is permitted to flow from diffuser 400 through valve 404, entering at process air inlet 608 and exiting at module port 612 to flow through a module 104.

In the second position, shown in FIG. 6C, valve head 628 is placed into engagement with first valve seat 620, thus isolating process air intake 608 from module port 612 and regeneration air output 616. In the second position, process air is prevented from entering chamber 604, and used regeneration air leaving module 104 travels through chamber 604 from module port 612 to regeneration air output 616, towards regeneration air outlet 116.

In the present example, chamber 604 is cylindrical, and thus valve seats 620 and 624 are annular ridges extending into chamber 604, while valve head 628 is a disk. The components of valve 404, however, may have also have various other structures, as will now be apparent to those skilled in the art. In general, the components of valve 404 are moveable between two positions, each defining a different flow path. One flow path places module 104 in communication with diffuser 400, and the other flow path places module 104 in communication with regeneration air outlet 116.

Figure 7:
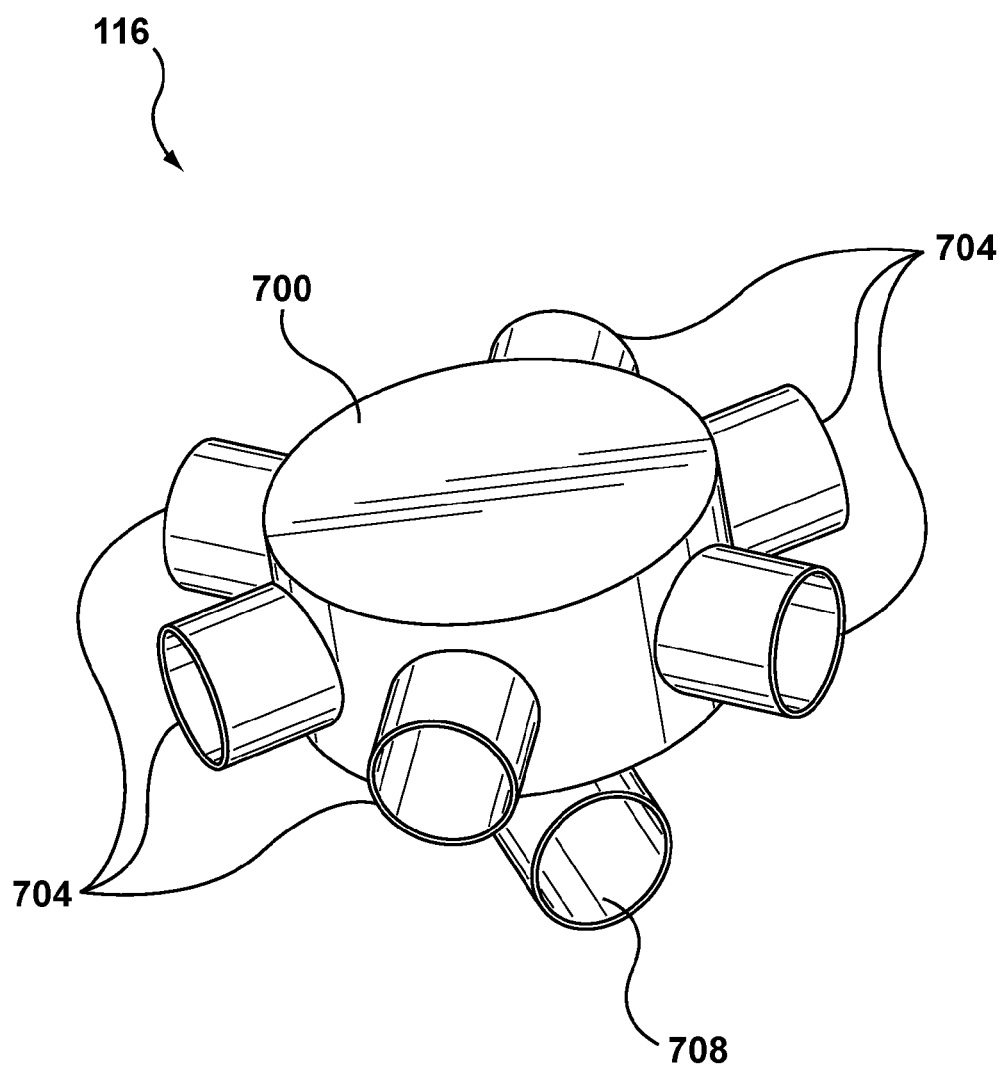
FIG. 7 depicts a regeneration air outlet of the apparatus of FIG. 1, according to a non-limiting embodiment.

Turning now to FIG. 7, regeneration air outlet 116 is depicted. Regeneration air outlet 116 includes a hollow body 700, a plurality of regeneration air intakes 704 (equal in number to the number of modules 104 present in apparatus 100), and a regeneration air exhaust port 708. Each regeneration air intake 704 couples to the regeneration air output 616 of a corresponding one of valves 404. Regeneration air received at regeneration air outlet 116 from the one of valves 404 corresponding to the module 104 currently under regeneration travels from the corresponding intake 704 through body 700 and to exhaust port 708. From exhaust port 708, the regeneration air may be exhausted to the atmosphere via conduit 127 and vacuum unit 126, with or without intermediate components such as the above-mentioned heat exchangers and coolers.

As will now be apparent to those skilled in the art, first air distribution assembly 112, comprising diffuser 400 and valves 404, receives regeneration air from one module 104 and delivers the regeneration air to regeneration air outlet 116, while delivering process air from process air inlet 114 to the remaining modules 104. First air distribution assembly 112 has a plurality of discrete positions, as defined by the positions of valves 404. In each position, one valve 404 is in the second position illustrated in FIG. 6C, while the remaining valves are in the first position illustrated in FIG. 6B.

Figure 8A:
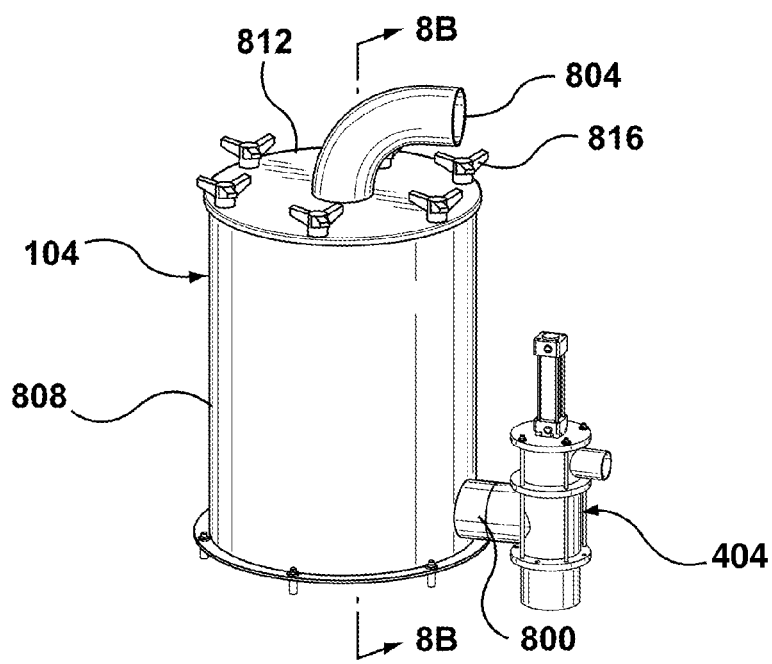
FIG. 8A depicts an isometric view of the module of the apparatus of FIG. 1, according to a non-limiting embodiment.
Figure 8B:
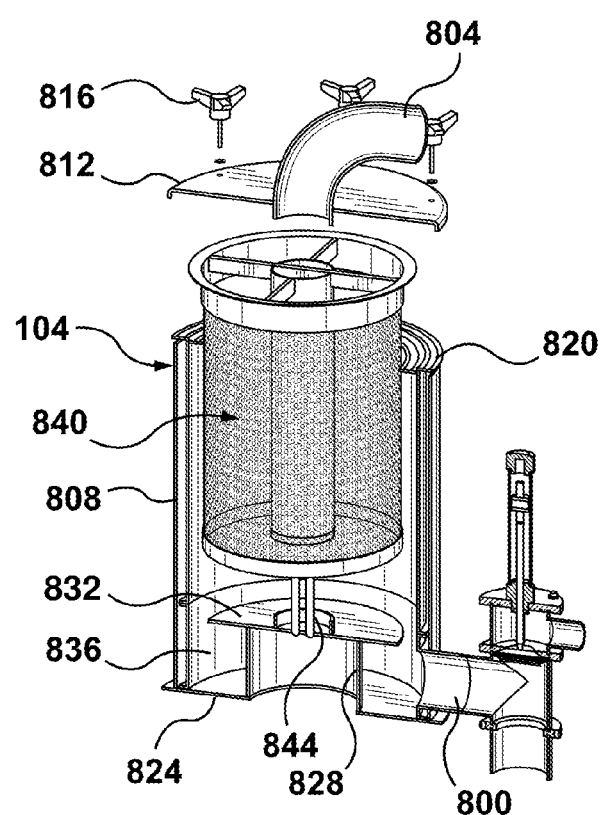
FIG. 8B depicts a partial section of the module of FIG. 8A, according to a non-limiting embodiment.

Referring now to FIGS. 8A and 8B, modules 104 will be described in greater detail. Module 104 defines an enclosed space or chamber with a first aperture 800 and a second aperture 804. As mentioned earlier, and as shown in FIGS. 8A and 8B, first aperture 800 is configured to connect module 104 to first air distribution assembly 112 (in particular to valve 404). Meanwhile, second aperture 804 is configured to connected module 104 to second air distribution assembly 118, via conduit 124.

The enclosed space of module 104 can be defined by a variety of structures. In the present example, module 104 includes a cylindrical sidewall 808 closed at both ends (with the exception of first and second apertures 800 and 804). Sidewall 808 can be a double wall with, for example, a partial vacuum in between the walls for insulation. Second aperture 804 is provided by a cover 812 removably coupled to one end of sidewall 808. Cover 812 can be coupled to sidewall 808 by fasteners, such as bolts 816, and a gasket 820 can be provided on the edge of sidewall 808 for sealing between sidewall 808 and cover 812.

First aperture 800 can be provided directly in sidewall 808, as shown in FIGS. 8A and 8B. In other embodiments, first aperture 800 can be provided by an additional cover similar to cover 812. The end of sidewall 808 opposite cover 812 can terminate in an annular base 824 and, connected to annular base 824 by a wall 828, a disk 832. In the present example, disk 832 has a greater diameter than wall 828, and thus extends towards, but not to, sidewall 808. As a result, disk 832 defines a channel 836 in communication with first aperture 800, and also in communication with the remainder of the enclosed space within module 104 via the gap between disk 832 and sidewall 808. In other embodiments, disk 832 need not have a greater diameter than wall 828. In further embodiments, base 824 need not be annular, but can instead by flat, and wall 828 can be omitted.

Module 104 also includes a removable desiccant basket 840 and a heater 844. Heater 844 can be connected to disk 832, and removable from module 104 via the cylindrical space defined by wall 828. Basket 840 can include a flange for supporting basket 840 within module 104 on gasket 820. In addition to, or instead of, being supported by such a flange, basket 840 can rest on disk 832 when installed within module 104.

Figure 9A:
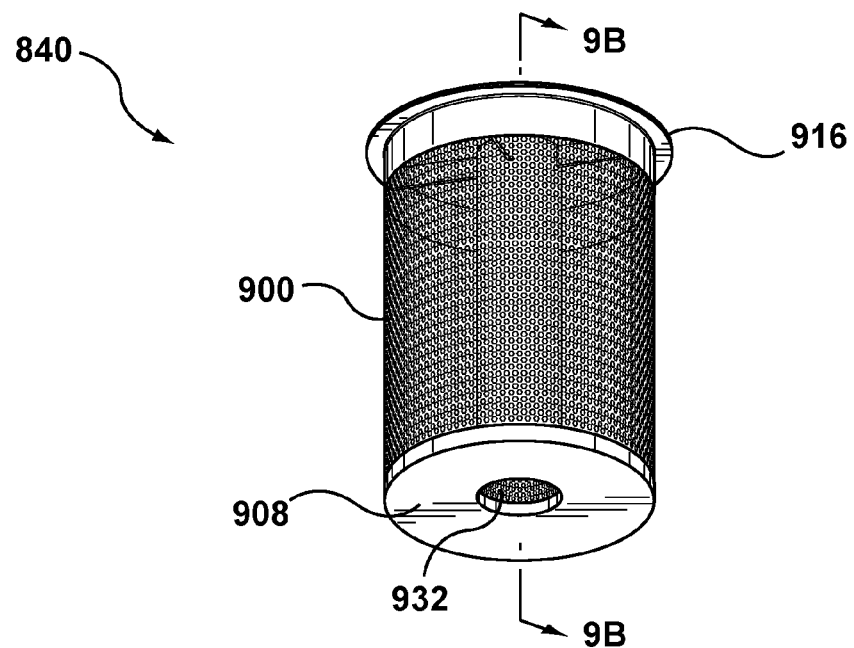
FIG. 9A depicts a basket contained within the module of FIG. 8A, according to a non-limiting embodiment.
Figure 9B:
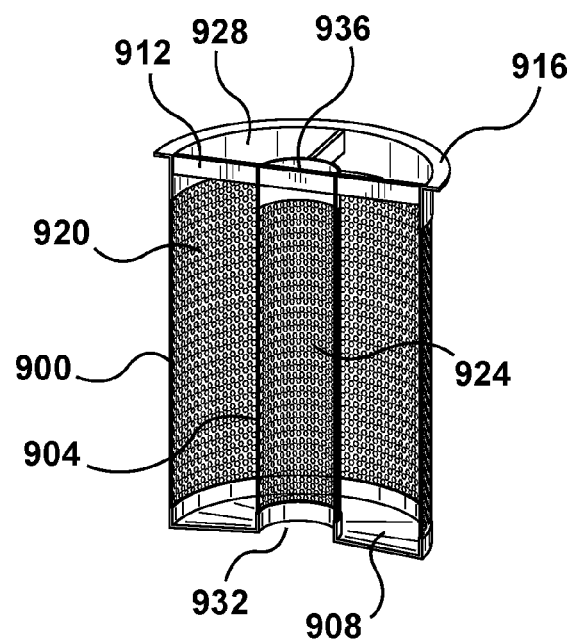
FIG. 9B depicts a cross-sectional view of the basket of FIG. 9A, according to a non-limiting embodiment.

Turning to FIGS. 9A and 9B, basket 840 is shown in greater detail. Basket 840 includes an air-permeable outer wall 900 and an air-permeable inner wall 904, which in the present example are both cylindrical. Outer wall 900 has a diameter that is smaller than the inner diameter of sidewall 808, such that a space remains between outer wall 900 and sidewall 808 when basket 840 is installed within module 104. Outer wall 900 and inner wall 904 are joined at one end by an annular base 908 and at an opposing end by supports 912. Supports 912 can also be employed as handles to remove basket 840 from module 104 when cover 812 is removed. As mentioned in connection with FIGS. 8A and 8B, basket 840 also includes a flange 916 for engaging with gasket 820 when basket 840 is installed within module 104. In the present example, outer wall 900 and inner wall 904 are formed of a perforated metal, such as stainless steel. Other materials may also be employed to obtain air-permeable walls, such as plastics, membranes and the like.

Outer wall 900 defines an outer channel 920, while inner wall 904 defines an inner channel 924. Outer channel 920 is closed at one end by base 908, and open at an opposing end 928. Inner channel 920 is open at both a first end 932 adjacent to base 908, and a second end 936 adjacent to supports 912. Desiccant material (not shown) is placed between outer wall 900 and inner wall 904 (that is, within outer channel 920). The type of desiccant used is not particularly limited. A presently preferred desiccant is a conventional molecular sieve material. It will now be apparent to those skilled in the art that the size of perforations in outer wall 900 and inner wall 904 are selected in part based on the nature of the desiccant material, so as to prevent any desiccant from leaving outer channel 920.

When basket 840 is installed within module 104, heater 844 is received within inner channel 924, and the base of heater 844 thus closes open end 932. Further, cover 812 closes open end 928. Thus, both ends of outer channel 920 are closed upon installation of basket 840 within module 104, and only open end 936 of inner channel 924 remains open. Specifically, open end 936 communicates with second aperture 804 of module 104. Therefore, air travelling through module 104 is restricted to one reversible flow path. More particularly, process air entering first aperture 800 travels into channel 836, between disk 832 and sidewall 808 and up the inner surface of sidewall 808. The process air then crosses through outer wall 900 into channel 920 containing the desiccant material. The process air travels through the desiccant material and inner wall 904 to reach inner channel 924, and then leaves module 104 through second open end 936 and second aperture 804.

Regeneration air travels in the reverse direction from process air. More specifically, regeneration air enters module 104 at second aperture 804, and travels into inner channel 924 via open end 936. From inner channel 924 (where regeneration air is heated by heater 844, which is activated during regeneration air flow), regeneration air travels through inner wall 904 into outer channel 920, and through the desiccant material in outer channel 920 to reach outer wall 900. The regeneration air (now carrying moisture absorbed from the desiccant material) crosses outer wall 900 to reach the space between sidewall 808 and outer wall 900, and then descends to channel 824 before leaving module 104 via first aperture 800.

Thus, each module 104 contains a desiccant material and is configured to permit airflow therethrough in opposite directions—from first aperture 800 to second aperture 804 for process air, and from second aperture 804 to first aperture 800 for regeneration air. A variety of other structures can also be employed for modules 104. For example, in some embodiments modules 104 can omit baskets 840; in further embodiments, heaters 844 may also be omitted, and regeneration air may be heated upstream of second aperture 804.

Figure 10A:
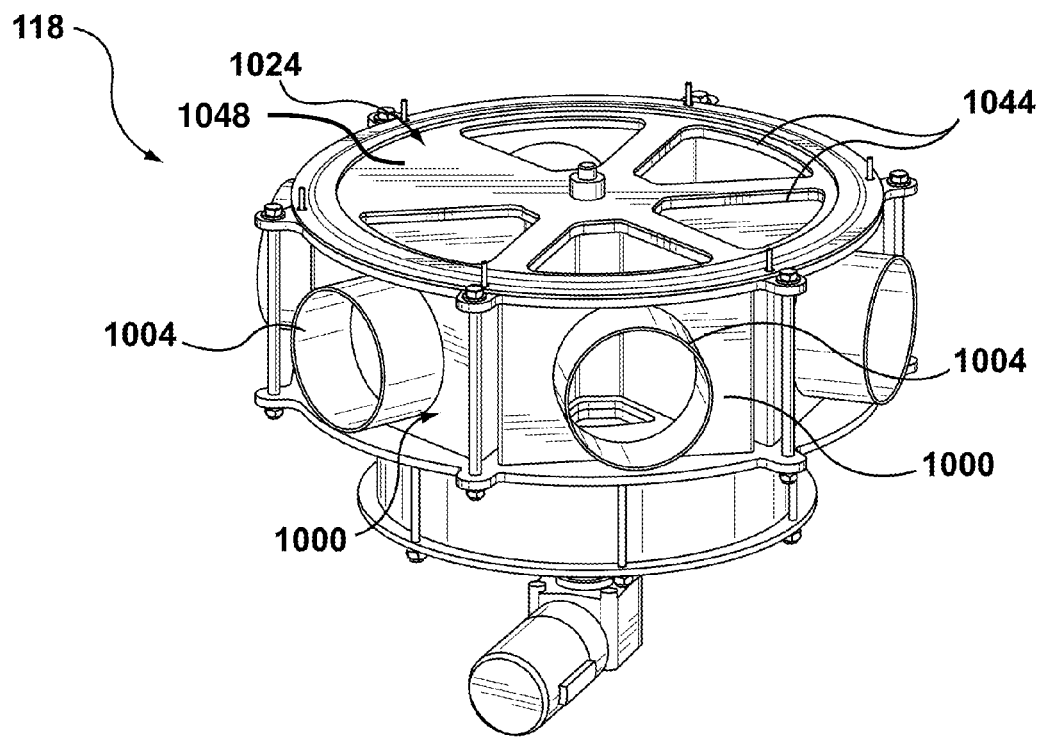
FIG. 10A depicts a second air distribution assembly of the apparatus of FIG. 1, according to a non-limiting embodiment.
Figure 10B:
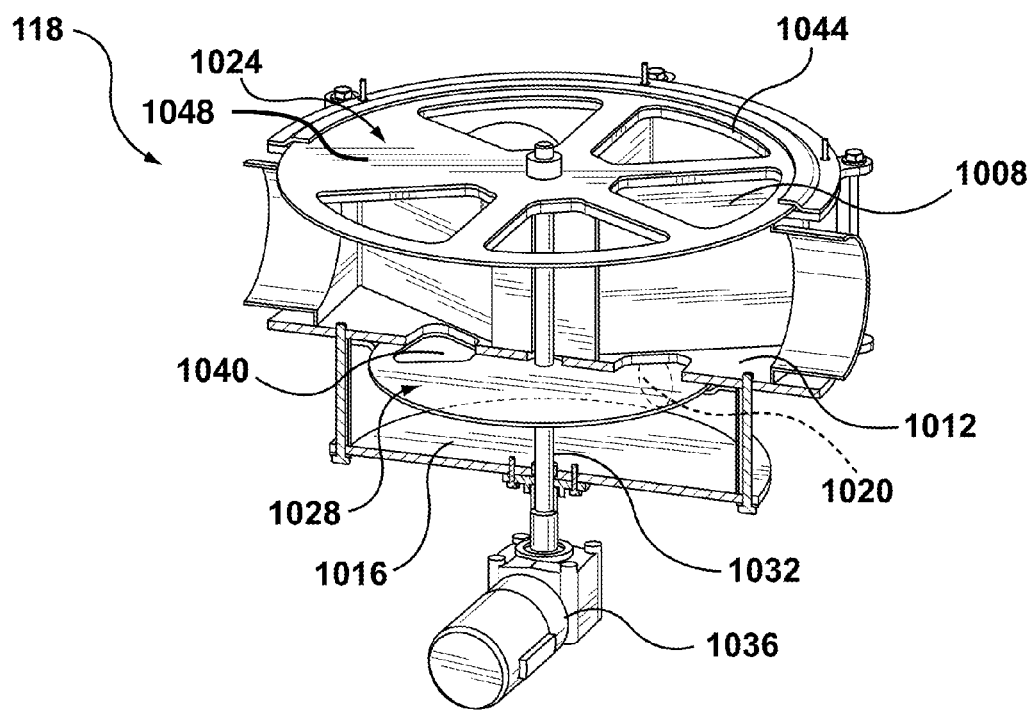
FIG. 10B depicts a partial section of the second air distribution assembly of FIG. 10A, according to a non-limiting embodiment.

Referring now to FIGS. 10A and 10B, second air distribution assembly 118 is shown in greater detail. In general, second air distribution assembly 118 includes at least one opening for delivering process air to process air outlet 106, an opening for receiving regeneration air, a plurality of openings for exchanging air with modules 104, and a selection mechanism for placing each of the module openings in communication with either the process air opening or the regeneration air opening.

In the present embodiment, second air distribution assembly 118 includes a number of channels 1000 equal to the number of modules 104 (thus, six in the present embodiment, one channel 1000 corresponding to each module 104). Channels 1000 are disposed in a circular arrangement in the present example, but other arrangements may also be employed. Channels 1000 each include a module port 1004, and opposing open ends 1008 and 1012. Open ends 1008 are in fluid communication (unless closed by the selection mechanism to be described below) with process air outlet 106, and open ends 1012 are in fluid communication (unless closed by the selection mechanism to be described below) with a regeneration plenum 1016. Regeneration air plenum 1016 includes an inlet 1020 in a wall thereof for receiving regeneration air from regeneration air inlet 120 (more specifically, from regeneration air inlet 120 via conduit 123, heat exchanger 130 and conduit 132).

The above-mentioned selection mechanism is provided to close one or the other of open ends 1008 and 1012. When open end 1008 of a given channel 1000 is closed and open end 1012 is open, regeneration air can flow into channel 1000 and to the corresponding module 104 via module port 1004. When open end 1012 is closed and open end 1008 is open, on the other hand, process air can flow from the corresponding module 104 into channel 104 via module port 1004 and on towards process air outlet 106.

In the present example, the selection mechanism is provided by a pair of movable disks, illustrated as a process air disk 1024 and a regeneration air disk 1028. Disks 1024 and 1028 are mounted on a shaft 1032, such that rotation of shaft 1032 rotates disks 1024 and 1028. Shaft 1032 can be driven by any suitable drive mechanism, such as a gear-drive motor 1036.

Disk 1028 includes a single aperture 1040, and disk 1024 includes a number of apertures 1044 equal to one less than the number of modules 104 (thus, in the present example, disk 1024 has five apertures). Disks 1024 and 1028 are aligned on shaft 1032 such that aperture 1040 is aligned with a solid portion 1048 of disk 1024 (that is, a portion not bearing an aperture 1044). Conversely, apertures 1044 are aligned with solid portions of disk 1028, and not with aperture 1040. Disks 1024 and 1028 are moveable between a plurality of discrete positions, equal in number to the number of modules 104 present in apparatus 100. In each discrete position, aperture 1040 is aligned with an open end 1012 of a channel 1000, and each one of apertures 1044 is aligned with an open end 1008 of a channel 1000. It will be understood that references to components being "aligned" in the passage above indicate that the aligned components both lie on an axis parallel to shaft 1032 (that is, they are directly "above" or "below" each other as illustrated in FIGS. 10A and 10B).

Because aperture 1040 is not aligned with any of apertures 1044, in each of the above-mentioned discrete positions, the open end 1012 of a single channel 1000 will be open, and the open end 1008 of that single channel 1000 will be closed. The remaining channels 1000 will instead have open ends 1008 open and open ends 1012 closed. The single channel 1000, as will now be apparent to those skilled in the art, corresponds to the module 104 under regeneration—regeneration air entering plenum 1016 travels to the channel 1000 via aperture 1040 and open end 1012, and then cannot exit via open end 1008 of that channel 1000 because open end 1008 is blocked by disk 1024. Therefore, the regeneration air instead enters the corresponding module 104 via module port 1004 and second aperture 804.

The remaining channels 1000 correspond to modules handling process air. Process air entering channels 1000 from module ports 1004 cannot enter plenum 1016, because open ends 1012 are blocked. Instead, the process air exits channels 1000 via open ends 1008, to travel to process air outlet 106.

Figure 11A:
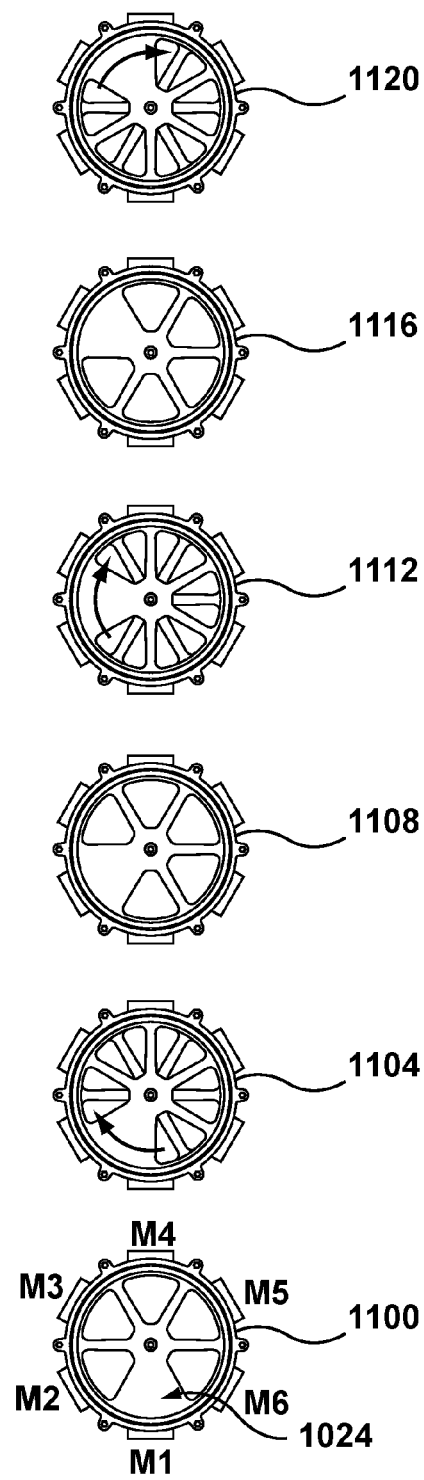
FIGS. 11A and 11B depict positions of process and regeneration disks, respectively, of the second air distribution assembly of FIG. 10A, according to a non-limiting embodiment.
Figure 11B:
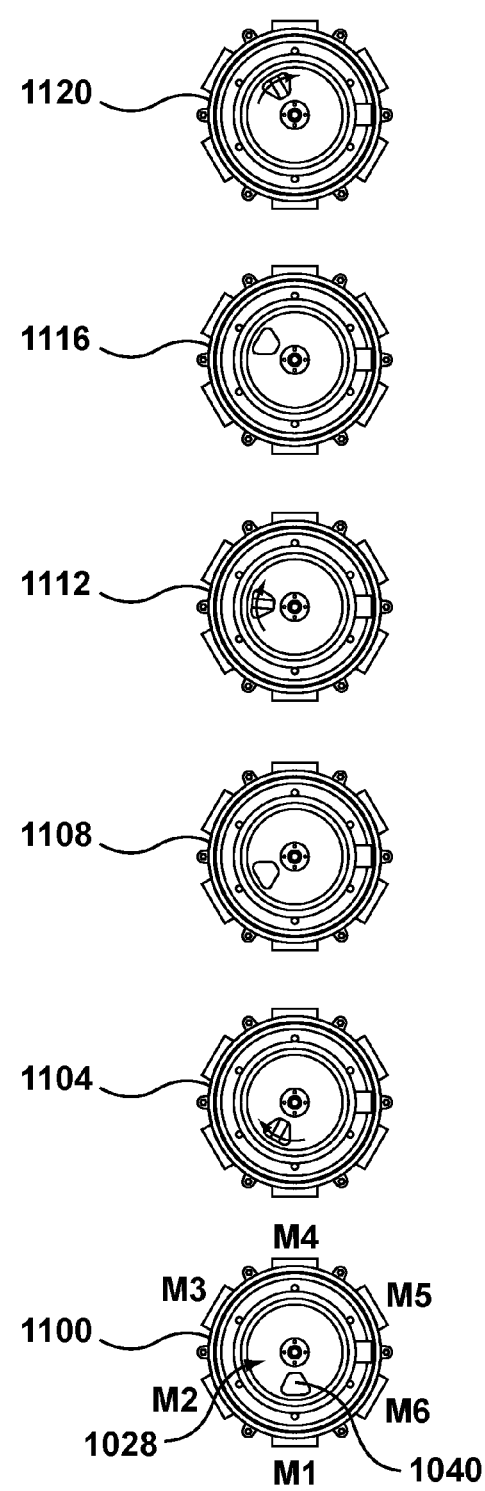

Second air distribution assembly 118 as illustrated in FIGS. 10A and 10B has six discrete positions, corresponding to the six modules 104 in apparatus 100. Turning to FIGS. 11A and 11B, three of the above-mentioned six discrete positions of disks 1024 and 1028 are shown. The three discrete positions shown are labelled 1100, 1108 and 1116. In each position, the module 104 connected to the channel 1000 aligned with aperture 1040—labelled "M1"—receive regeneration air from plenum 1016, while the remaining modules 104—labelled "M2", "M3", "M4", "M5" and "M6"—deliver process air to their corresponding channels 1000.

In response to instructions (to be discussed in greater detail below) to transition to the next position, motor 1036 drives shaft 1032 to rotate disks 1024 and 1028 through transitions 1104, 1112 and 1120 as shown in FIGS. 11A and 11B. During each transition, delivery of regeneration air into plenum 1016 can be blocked, and two adjacent open ends 1008 are partially covered. Thus, during transition 1104, module M1 (which was under regeneration in position 1100 and will receive process air in position 1108) and module M2 (which received process air in position 1100 and will receive regeneration air in position 1108) both receive process air. The flow of process air to modules M1 and M2 may be reduced, however, as both corresponding openings 1008 are partially obstructed by disk 1024.

Figure 12:
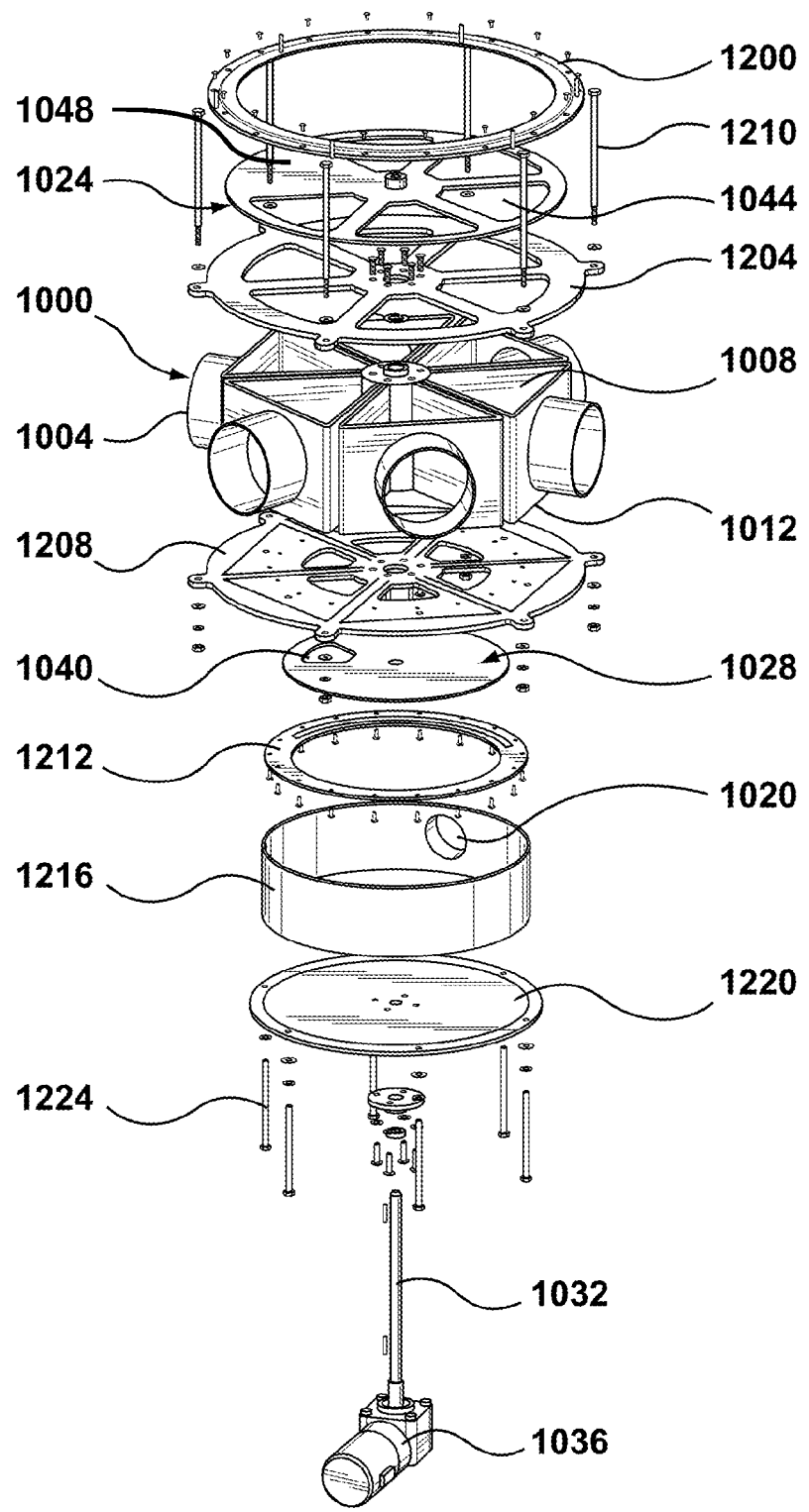
FIG. 12 depicts and exploded view of the second air distribution assembly of FIG. 10A, according to a non-limiting embodiment.

Various structural elements may be provided to support channels 1000 and disks 1024 and 1028. FIG. 12 depicts an exemplary structure for second air distribution assembly 118; those skilled in the art will appreciate that variations on the structure shown in FIG. 12 can also be employed.

As shown in FIG. 12, disk 1024 can be slidably supported by a guide disk 1200. Guide disk 1200 is connected to fixed support plates 1204 and 1208 by fasteners 1210. Channels 1000 are supported between support plates 1204 and 1208. Regeneration air plenum 1016 is defined by disk 1040, a guide disk 1212 slidably supporting disk 1040, a cylindrical wall 1216, and a cover 1220. Cover 1220, wall 1216 and guide disk 1212 are connected to support plate 1208 by fasteners 1224.

Having described the components of apparatus 100 in detail, a discussion of the operation of apparatus 100 is provided below. The components of apparatus 100—specifically, the components having multiple states or positions, such as blower 102, vacuum unit 126, valves 404, gear-drive motor 1036, and the like—can be connected to a controller (not shown) such as a programmable logic controller (PLC), desktop computer or the like. The controller is configured to send instructions to each of the above-mentioned components in sequence to operate apparatus 100.

FIG. 13 depicts a method 1300 performed by the controller for operating apparatus 100. At block 1305, at system start-up, the controller activates blower 102. At block 1310, the controller sets first air distribution assembly 112 and second air distribution assembly 118 to the next discrete position (if the air distribution assemblies were not already in a discrete position at system start-up). In other words, the controller instructs all but one of valves 404 to move to the process air position shown in FIG. 6B, and the final valve 404 to move to the regeneration position shown in FIG. 6C. Also at block 1310, the controller instructs motor 1036 to rotate shaft 1032 into a position in which the same module connected to the valve 404 in the regeneration air position is placed in communication with regeneration air plenum 1016.

At block 1315, the controller activates vacuum unit 126 and the heater 844 of the module 104 under regeneration. In some embodiments, vacuum unit 126 can remain in operation at all times (and can thus be activated at block 1305), and the interruption of regeneration air flow can be achieved instead by a valve between inlet 120 and second air distribution assembly 118. In still other embodiments, the shut-off valve for regeneration air can be within second air distribution assembly 118, for example in the form of a valve that can close aperture 1040.

Following the performance of block 1315, one module 104 receives regeneration air, and the other modules 104 receive process air. At block 1320, the controller determines whether a cycling condition has been met. The cycling condition, in general, is a criterion (or multiple criteria) that, when satisfied, cause the controller to cycle first and second air distribution assemblies 112 and 118 to the next discrete position. Examples of cycling conditions include the passage of a predetermined period of time; the receipt of a dew-point measurement from a dew-point sensor (not shown) at the controller that meets a threshold; and the like. For example, dew-point sensors can be deployed in each module 104, and when the dew-point of regeneration air leaving the module 104 under regeneration falls below a threshold, the controller can make an affirmative determination at block 1320. Other arrangements of sensors and cycling conditions will now occur to those skilled in the art.

When the determination at block 1320 is negative, apparatus 100 continues operating in the state set at block 1315. When the determination at block 1320 is affirmative, however, performance of method 1300 proceeds to block 1325. At block 1325, the controller deactivates the heater 844 in the module 104 under regeneration, and also deactivates vacuum unit 126 (or, as mentioned above, shuts off the flow of regeneration air by way of a valve).

Next, at block 1330, the controller instructs first and second air distribution assemblies 112 and 118 to transition to the next position. Thus, during the performance of block 1330, no regeneration air flows through apparatus 100, and all modules 104 receive process air. The module 104 most recently under regeneration receives a gradually increasing flow of process air, which also acts to cool the module 104 and reduce the incidence of spikes in temperature of process air leaving outlet 106. Meanwhile, the module 104 that will next be under regeneration receives a gradually decreasing flow of process air as disk 1024 rotates to cover the open end 1008 of that module 104.

Once the first and second air distribution assemblies 112 and 118 have arrived at the next position, the performance of method 1300 returns to block 1315, at which the next heater 844 is activated, as well as vacuum unit 126.

Turning to FIG. 14, a schematic diagram of the air flow paths in apparatus 100 is shown. The path of process air is illustrated sequentially as paths 1400 and 1404, while the path of regeneration air comprises, in sequence, paths 1408, 1412, 1416, 1420 and 1424.

In addition to the process control discussed above, it is possible to remove a module 104 from apparatus 100 without during the operation of apparatus 100. For example, in response to a command (for example, from an operator), the controller can instruct a valve 404 other than the valve connected to the module under regeneration to move to the regeneration position shown in FIG. 6C. This interrupts the flow of process air to that module, and the module may then be removed for inspection. More generally, shut-off valves may be included adjacent to apertures 800 and 804 of each module 104, allowing any module to be isolated from apparatus 100 and removed. The controller can also be configured to cause blower 102 to increase its output as necessary for consistent process air output from outlet 106, in the absence of the removed module 104.

Variations to the exemplary structures described above are contemplated. For example, turning to FIGS. 15A and 15B, a valve 1500 is depicted for use as second air distribution assembly 118. Rather than the components shown in FIGS. 10-12, second air distribution assembly 118 can instead include a number of valves 1500 equal to the number of modules 104 in apparatus 100.

Valve 1500 includes a channel 1504 defined by the fixed housing of valve 1500. Channel 1504 includes a module port 1508 for connecting to second aperture 804 of a module 104. Channel 1504 also includes a process air output 1512 for connecting to outlet 106, and a regeneration air intake 1516 for receiving regeneration air from inlet 120. It will be understood that additional structures and conduits may be provided to link the outputs 1512 of all valves 1500 to outlet 106, and to link inlet 120 to all intakes 1516 of valves 1500.

Valve 1500 also includes a selection mechanism for selectively closing one or the other of output 1512 and intake 1516. In particular as shown in FIG. 15B (in which the housing of valve 1500 is omitted to reveal internal components), the selection mechanism includes a rotatable tube 1520 driven by an actuator 1524 (such as a pneumatic actuator or servomotor). Tube 1520 includes two module apertures 1528 and 1532 on opposite sides of tube 1520. In addition, tube 1520 includes a single process aperture 1536 and a single regeneration aperture 1540. Process aperture 1536 is aligned (that is, on the same side of tube 1520) with module aperture 1528, while regeneration aperture 1540 is aligned with module aperture 1532.

Valve 1500 has three discrete positions, as shown in cross-section in FIG. 16. In a process air position 1600, aperture 1536 is aligned (that is, in fluid communication with) output 1512, and aperture 1532 is aligned with module port 1508, to receive process air from module 104 (the unused apertures are not illustrated in FIG. 16 for simplicity). In a regeneration air position 1608, tube 1520 is rotated to place aperture 1528 in line with module port 1508, and aperture 1540 in line with regeneration intake 1516. Further, in a closed position 1604 tube 1520 is rotated to a position between positions 1600 and 1608, such that none of the apertures shown in FIG. 15B line up with the ports, intakes and outputs shown in FIG. 15A. Thus, in position 1604, no air is permitted to flow from second air distribution assembly 118 to module 104, or from module 104 to second air distribution assembly 118. Also shown in FIG. 16 is a transition 1612 from either of positions 1604 and 1608 to position 1600.

Turning to FIGS. 17A and 17B, in another variation, a valve 1700 may be used in place of each valve 404 in first air distribution assembly 112. Valve 1700 includes a channel 1704 defined by an outer valve body, a module port 1708, a process air intake 1712 and a regeneration air output 1716. Valve 1700 also includes a selection mechanism for selectively closing one or the other of output 1716 and intake 1712.

As shown in FIG. 17B, the selection mechanism includes a sliding gate 1720 having a regeneration aperture 1724 and a process aperture 1728. Gate 1720 is slidably mounted within channel 1704, and driven between three discrete positions by an actuator 1732 (such as a pneumatic actuator or a servomotor). The positions are shown in FIG. 18

In a process air position 1800, gate 1720 is placed within channel 1704 such that aperture 1728 is aligned with intake 1712, and aperture 1724 is out of alignment with output 1716. Thus, process air flows through valve 1700 into module 104. In a closed position 1804, gate 1720 is positioned within channel 1704 such that both output 1716 and intake 1712 are blocked. In a regeneration position 1808, aperture 1724 is aligned with output 1716, while aperture 1728 is out of alignment with intake 1712. A transition 1812 is also shown, from either of positions 1804 and 1808 to position 1800.

Additionally, in some embodiments, as shown in FIG. 19, a bypass valve 1900 may be provided on a conduit 1904 extending from blower 102 to outlet 106. Bypass valve can be controlled by the controller mentioned above in connection with FIG. 13. When the first and second air distribution assemblies 112 and 118 are in a discrete position, the controller can instruct bypass valve 1900 to remain closed. When the first and second air distribution assemblies are transitioning to the next discrete position, however, the controller can open bypass valve 1900 to allow process air to flow directly from blower 102 to outlet 106, in addition to flowing through modules 104. As seen in FIGS. 11A and 11B, during the transitions between discrete positions, disk 1024 obstructs parts of each open end 1008, which may decrease air flow to outlet 106. Thus, opening bypass valve 1900 during such transitions can supplement air flow at outlet 106 so that the flow of process air to downstream equipment (such as a resin dryer) remains consistent. It will now be apparent that air travelling through conduit 1904 is not treated by modules 104, and thus may increase the humidity of process air leaving outlet 106. The effect on process air delivered from outlet 106 is expected to be small, as the volume of air flowing through conduit 1904 compared to the air flowing through modules 104 is small. In embodiments where even greater consistency of humidity levels at outlet 106 is more desirable than constant air flow at outlet 106, bypass valve 1900 and conduit 1904 may be omitted.

Other variations to the mechanisms described above are also contemplated. For example, modules 104 as illustrated in FIGS. 8A and 8B can be replaced by conventional desiccant beds in some embodiments. In further embodiments, more than one module 104 can be placed under regeneration at a given time, by modifying second air distribution assembly (e.g. to place two apertures in disk 1028 rather than single aperture 1040, and to remove one of apertures 1044 from disk 1024). In still further embodiments, disks 1024 and 1028 may be replaced by an annular bank of valves opening and closing the open ends of channels 1000.

In a further variation, regeneration air can travel in the same direction as the process air, rather than in the opposite direction. In such a variation, regeneration air outlet 116 instead acts as an inlet for regeneration air, and vacuum unit 126 is thus connected to regeneration air plenum 1016 instead of regeneration air outlet 116. Rather than receiving regeneration air from inlet 120 and delivering the regeneration air to a module 104, regeneration air plenum 1016 receives used regeneration air from a module 104 and can deliver the regeneration air either to vacuum unit 126 directly or to heat exchanger 128 (from where the regeneration air can travel on to vacuum unit 126, optionally via heat exchanger 130, which can pre-heat regeneration air entering regeneration air outlet 116). In such a variation, heaters 844 may be re-oriented, for example to be installed in channels 836 rather than inner channels 924.

Various advantages to the apparatus described above may now occur to those skilled in the art. For example, the flow of process air into and through baskets 840 towards the centre thereof can act to pressurize beads of desiccant material, which may increase the effectiveness with which the beads absorb moisture from the process air. Further, the reverse (relative to the flow of process air) flow of regeneration air through modules 104 can depressurize the grains of desiccant material, and the use of vacuum unit 126 can lower the temperature to which the regeneration air must be heated to effectively remove moisture from modules 104. As a further example, the use of more than three modules, such that at least two modules handle process air at any given time, can provide more consistent humidity for process air leaving outlet 106. Other advantages may occur to those skilled in the art.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

We claim:
1. A dehumidifying apparatus, comprising:
a first air distribution assembly connected to a process air inlet for receiving process air from the process air inlet, and to a regeneration air outlet for exhausting regeneration air via a vacuum unit;
a second air distribution assembly connected to a process air outlet for delivering process air to the process air outlet, and to a regeneration air inlet for receiving regeneration air;
at least three stationary modules connected in parallel between the first air distribution assembly and the second air distribution assembly; each module containing a desiccant and having a first aperture for connecting to the first air distribution assembly, and an opposite second aperture for connecting to the second air distribution assembly;
a heater associated with each of said at least three stationary modules;
the first and second air distribution assemblies configured to cycle between a number of discrete positions equal to the number of modules; in each position, the first and second air distribution assemblies configured to establish:
a regeneration air flow from the regeneration air inlet to the regeneration air outlet via said heater and, in sequence: the second air distribution assembly, the second aperture of one module, the first aperture of the one module, and the first air distribution assembly; and
a plurality of process air flows from the process air inlet to the process air outlet via, in sequence: the first air distribution assembly, the first aperture of each remaining module, the second aperture of each remaining module, and the second air distribution assembly.

2. The dehumidifying apparatus of claim 1, the process air inlet receiving the process air from a blower.

3. The dehumidifying apparatus of claim 2, the process air outlet configured to deliver the process air to a plastic resin dryer, and the blower configured to receive process air recycled from the plastic resin dryer.

4. The dehumidifying apparatus of claim 1, each module comprising a chamber containing a removable basket for holding the desiccant material.

5. The dehumidifying apparatus of claim 4, the basket comprising an air-permeable outer wall defining an outer channel, and an air-permeable inner wall joined to the outer wall by an annular base; the inner wall defining an inner channel within the outer channel; the basket for holding the desiccant material in the outer channel between the inner wall and the outer wall.

6. The dehumidifying apparatus of claim 5, the chamber including:
a sidewall encircling the outer wall of the basket;
a cap removably sealed to the sidewall and closing an end of the outer channel opposite to the annular base;
a base coupled to the sidewall at an end of the sidewall opposite to the cover.

7. The dehumidifying apparatus of claim 6, the first aperture being defined in the sidewall between the base and the annular base of the basket; the second aperture being defined in the cover in alignment with the inner channel of the basket.

8. The dehumidifying apparatus of claim 7, wherein said heater is a heater located in each module and is coupled to the base of the chamber and extends into the inner channel of the basket.

9. The dehumidifying apparatus of claim 8, the heater being removable from the module via the base.

10. The dehumidifying apparatus of claim 1, the second air distribution assembly comprising:
a plurality of channels, corresponding to respective ones of the modules; each channel having a port for connecting to the corresponding module, a channel intake for receiving regeneration air from the regeneration air inlet, and a channel output for delivering process air to the process air outlet; and
a selection mechanism for, at each channel, connecting one of the channel intake and the channel output to the port and closing the other of the channel intake and the channel output.

11. The dehumidifying apparatus of claim 10, the selection mechanism comprising a process air disk and a regeneration air disk disposed at opposing ends of the channels; the process air disk having one less aperture than the number of modules, and the regeneration air disk having a single aperture;
the single aperture of the regeneration air disk aligned with the channel intake of a single one of the channels, and the apertures of the process air disk aligned with respective channel outputs of the remaining channels.

12. The dehumidifying apparatus of claim 11, the second air distribution assembly further comprising a regeneration air plenum for receiving regeneration air from the regeneration air inlet and delivering the regeneration air through the single aperture to one of the channels.

13. The dehumidifying apparatus of claim 11, the process air disk and the regeneration air disk mounted on a rotatable shaft having a plurality of discrete positions, such that in each of the positions, one of the modules receives regeneration air from the second air distribution assembly and the remaining modules deliver process air to the second air distribution assembly.

14. The dehumidifying apparatus of claim 1, further comprising:
a heat exchanger connected between the second air distribution assembly and the process air outlet, such that process air leaving the second air distribution assembly from the modules travels through the heat exchanger;
a conduit from the regeneration air outlet to the heat exchanger, for transferring heat from the regeneration air to the process air.

15. The dehumidifying apparatus of claim 1, further comprising a heat exchanger for receiving regeneration air from the regeneration air outlet;
the regeneration air inlet connected to the heat exchanger for transferring heat from the regeneration air leaving the regeneration air outlet to regeneration air entering the regeneration air inlet.

16. The dehumidifying apparatus of claim 1, further comprising a vacuum unit connected to the regeneration air outlet for pulling regeneration air through the apparatus.

17. The dehumidifying apparatus of claim 1, wherein the at least three modules are disposed in an annular arrangement.

18. The dehumidifying apparatus of claim 1, further comprising a controller for controlling the first and second air distribution assemblies.

19. The dehumidifying apparatus of claim 1, further comprising a conduit connecting the blower to the process air outlet, and a bypass valve on the conduit, for opening the conduit when the first and second air distribution assemblies are in transition between positions.

20. The dehumidifying apparatus of claim 1, comprising at least four modules.

21. The dehumidifying apparatus of claim 1, the first air distribution assembly comprising:
a diffuser connected to the process air inlet;
at least three valves connected between the diffuser and the modules, at least one of the valves having a chamber connected to the diffuser at a process air intake, to a respective one of the modules at a module port, and to the regeneration air outlet at a regeneration air output;
the at least one valve further comprising valve seats within the chamber on either side of the module port, and a valve head mounted on a slidable rod;
the valve head configured to engage with a first one of the valve seats in a process air position to place the module port and the process air intake in communication, and to engage with a second one of the valve seats in a regeneration position to place the module port and the regeneration air output in communication.

22. The dehumidifying apparatus of claim 1, the first air distribution assembly comprising:
a diffuser connected to the process air inlet;
at least three valves connected between the diffuser and the modules, at least one of the valves having a channel connected to the diffuser at a process air intake, to a respective one of the modules at a module port, and to the regeneration air outlet at a regeneration air output;
the at least one valve further comprising a gate slideable between three positions within the channel and having a process aperture and a regeneration aperture therethrough;

the gate configured:
- in a first one of the positions, to align the process aperture with the process air intake to place the process air intake in communication with the module port;
- in a second one of the positions, to align the regeneration aperture with the regeneration air output to place the regeneration air output in communication with the module port; and
- in a third one of the positions, to isolate the module port from the process air intake and the regeneration air output.

23. The dehumidifying apparatus of claim 1, the second air distribution assembly comprising at least three valves corresponding to respective ones of the modules;
- at least one of the valves having a channel connected to a respective one of the modules by a module port, to the process air outlet by a process air output, and to the regeneration air inlet by a regeneration air intake;
- the at least one valve including a tube within the channel rotatable between three positions, the tube having a regeneration aperture, a process air aperture, and first and second module apertures;
- the tube configured, in a first one of the positions, to align the first module aperture with the module port, and the process air aperture with the process air outlet;
- the tube configured, in a second one of the positions, to align the second module aperture with the module port, and the regeneration air aperture with the regeneration air intake; and
- the tube configured, in a third one of the positions, to isolate the module port from the process air output and the regeneration air intake.

* * * * *